United States Patent
Miyoshi et al.

(10) Patent No.: US 8,263,697 B2
(45) Date of Patent: Sep. 11, 2012

(54) HEAT-RESISTANT RESIN COMPOSITION

(75) Inventors: Takaaki Miyoshi, Tokyo (JP); Kazuya Noda, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 825 days.

(21) Appl. No.: 12/084,897

(22) PCT Filed: Nov. 14, 2006

(86) PCT No.: PCT/JP2006/322654
§ 371 (c)(1),
(2), (4) Date: Feb. 17, 2009

(87) PCT Pub. No.: WO2007/058169
PCT Pub. Date: May 24, 2007

(65) Prior Publication Data
US 2009/0305016 A1 Dec. 10, 2009

(30) Foreign Application Priority Data

Nov. 15, 2005 (JP) .................................. 2005-329894
Dec. 8, 2005 (JP) .................................. 2005-354771
Dec. 9, 2005 (JP) .................................. 2005-355583

(51) Int. Cl.
B32B 27/20 (2006.01)
B32B 27/34 (2006.01)
B32B 27/36 (2006.01)
C08K 7/14 (2006.01)
C08K 3/40 (2006.01)

(52) U.S. Cl. ........ 524/494; 428/220; 524/492; 524/493; 524/538

(58) Field of Classification Search .................. 428/220; 524/538, 492, 493, 494, 495, 606
See application file for complete search history.

(56) References Cited

U.S. PATENT DOCUMENTS

| | | | |
|---|---|---|---|
| 2,852,485 A * | 9/1958 | Stott et al. ..................... | 524/538 |
| 5,147,942 A * | 9/1992 | Abe et al. ...................... | 525/397 |
| 5,278,231 A * | 1/1994 | Chundury ...................... | 525/66 |
| 6,156,869 A | 12/2000 | Tamura et al. | |
| 2003/0023008 A1 * | 1/2003 | Uchida et al. ................. | 525/432 |
| 2004/0135371 A1 | 7/2004 | Masuda et al. | |
| 2004/0266916 A1 * | 12/2004 | Harashina et al. ............ | 523/217 |
| 2005/0038159 A1 | 2/2005 | Elkovitch et al. | |
| 2005/0038171 A1 * | 2/2005 | Elkovitch et al. ............. | 524/494 |
| 2005/0038191 A1 | 2/2005 | Elkovitch et al. | |
| 2005/0038203 A1 | 2/2005 | Elkovitch et al. | |

FOREIGN PATENT DOCUMENTS

| | | |
|---|---|---|
| CN | 1126224 | 7/1996 |
| CN | 1159203 | 9/1997 |
| CN | 1394910 | 2/2003 |
| EP | 0 659 799 | 6/1995 |
| EP | 0 685 527 | 12/1995 |
| EP | 1 262 525 | 12/2002 |
| JP | 05070682 A * | 3/1993 |
| JP | 2000-212433 | 8/2000 |
| JP | 2000-212434 | 8/2000 |
| JP | 2002-338805 | 11/2002 |
| JP | 2004-83792 | 3/2004 |
| JP | 2004-83817 | 3/2004 |
| JP | 2004-143240 | 5/2004 |

OTHER PUBLICATIONS

Machine Translation of JP 05-070682A.*
European Search Report for corresponding European Patent Application No. 06823378.2, issued on May 25, 2011.
Chinese Office Action for CN 200680042441.1, issued on Aug. 5, 2010.
International Search Report mailed Jan. 16, 2007 in connection with the International application PCT/JP2006/322654.

* cited by examiner

*Primary Examiner* — Ling Choi
*Assistant Examiner* — Darcy D Laclair
(74) *Attorney, Agent, or Firm* — Staas & Halsey LLP

(57) ABSTRACT

Disclosed is a resin composition comprising an aromatic polyamide having a terminal amino group concentration of 5 to 45 μmoles/g inclusive, polyphenylene ether, a compatibilizing agent for the polyamide and the polyphenylene ether, and a crystal nucleating agent. The composition is extremely useful in an automotive body panel (e.g., an automotive fender), an SMT-compliant component or the like.

20 Claims, No Drawings

HEAT-RESISTANT RESIN COMPOSITION

CROSS REFERENCE TO RELATED APPLICATIONS

This application claims the benefit under 35 U.S.C. Section 371, of PCT International Application Number PCT/JP2006/322654, filed Nov. 14, 2006 and Japanese Application Nos. 2005-329894 filed Nov. 15, 2005, 2005-354771 filed Dec. 8, 2005 and 2005-355583 filed Dec. 9, 2005 in Japan, the contents of all of which are incorporated herein by reference.

TECHNICAL FIELD

The present invention relates to a resin composition having excellent heat resistance, impact strength, low water absorbance, excellent fluidity and a low linear expansion coefficient. In addition, the present invention also relates to a sheet having excellent heat resistance, impact strength, low water absorbance and excellent fluidity, which also has excellent vacuum moldability.

The resin composition and sheet obtainable by the present invention can be advantageously employed in a broad range of fields, such as electric or electronic parts, office automation parts, automotive parts and machine parts. Especially, such resin composition and sheet can be preferably employed for the exterior material of an automobile by harnessing the low linear expansion coefficient and low water absorbance. Further, because the resin composition according to the present invention has a heat resistance capable of withstanding a lead-free solder compatible reflow furnace, and also has excellent weld strength required for an SMT connector and the like, which is a factor in cracking at pin push-in, the composition can be preferably used for SMT-applicable parts as well.

BACKGROUND ART

Polyamide-polyphenylene ether alloy has conventionally been used in a great variety of applications, such as automotive exterior materials and the junction blocks in an automobile engine room.

As the polyamide used in such a polyamide-polyphenylene ether alloy, polyamides having comparatively low heat resistance, such as polyamide 6,6 and polyamide 6, have been mainly used.

However, a polyamide-polyphenylene ether resin composition using these low-heat-resistance polyamides has a large dimensional change from water absorbance or heat, so that when used for instance as an exterior material, such as a fender, in order to maintain the gap with the door, there are various constraints such as having to take extra care with the fender installation method.

Further, from the early days of environmental regulation, the solder used for SMT (surface mount technology) rapidly moved to lead-free solder, so that the temperature in the furnace of the reflow apparatus used during surface mounting has become hotter.

As a result, the problem arises of blister, etc. during mounting for connectors composed of a conventional polyamide-polyphenylene ether material using polyamide 6,6 or the like, and thus there has been a need for improvement.

To solve the various problems caused by water absorbance, JP-A-2000-212433, JP-A-2000-212434 and JP-A-2004-083792, for example, describe techniques which use a specific aromatic polyamide as the polyamide material used for the polyamide-polyphenylene ether.

Further, U.S. Published Patent Application Nos. 2005-0038159, 2005-0038171, 2005-0038191 and 2005-0038203 describe techniques which use an aromatic polyamide having at least a specific amount for their terminal amino group concentration.

However, with these techniques, it is difficult to maintain a balance between sufficient fluidity and impact resistance. Further, there is also the problem that weld strength is insufficient, which has a direct effect on the strength against pin push-in required for an SMT-applicable connector and the like. Thus, there is a need for further improvements.

Patent Document 1: JP-A-2000-212433
Patent Document 2: JP-A-2000-212434
Patent Document 3: JP-A-2004-083792
Patent Document 4: U.S. Published Patent Application No. 2005-0038159
Patent Document 5: U.S. Published Patent Application No. 2005-0038171
Patent Document 6: U.S. Published Patent Application No. 2005-0038191
Patent Document 7: U.S. Published Patent Application No. 2005-0038203

DISCLOSURE OF THE INVENTION

Problem to be Solved by the Invention

An object of the present invention is to provide a resin composition having excellent heat resistance, impact strength, low water absorbance excellent fluidity and a low linear expansion coefficient, in which the weld strength is strong and cracking at pin push-in is substantially improved.

Another object of the present invention is to provide a film which comprises all of the above-described characteristics.

Yet another object of the present invention is to provide a method for producing a conductive resin composition which retains the above-described characteristics, wherein the resin temperature during processing can be substantially reduced.

Means for Solving the Problem

As a result of investigations carried out to solve the above-described problems, the present inventors discovered that these difficult problems could be solved by, surprisingly, using a resin composition comprising a specific aromatic polyamide, polyphenylene ether, a compatibilizer for the aromatic polyamide and the polyphenylene ether, and a crystal nucleating agent, thereby arriving at the present invention.

The present invention is as follows.

(1) A resin composition comprising an aromatic polyamide composed of dicarboxylic acid units (a) containing 60 to 100% by mole of terephthalic acid units, and diamine units (b) containing 60 to 100% by mole of 1,9-nonamethylenediamine units (b-1) and/or 2-methyl-1,8-octamethylenediamine units (b-2), polyphenylene ether, a compatibilizer for the polyamide and the polyphenylene ether and a crystal nucleating agent, wherein the aromatic polyamide has a terminal amino group concentration of 5 μmol/g or more and 45 μmol/g or less.

(2) The resin composition according to the above (1), wherein the amount of crystal nucleating agent is 0.01 to 1 part by mass based on a total of 100 parts by mass of the aromatic polyamide and the polyphenylene ether.

(3) The resin composition according to the above (1), wherein the aromatic polyamide has a terminal amino group concentration of 10 mmol/g or more and 35 μmol/g or less.

(4) The resin composition according to the above (1), wherein in the diamine units of the aromatic polyamide the ratio of the 1,9-nonamethylenediamine units (b-1) based on the total content of 1,9-nonamethylenediamine units (b-1) and 2-methyl-1,8-octamethylenediamine units (b-2) is 75 to 90% by mass.

(5) The resin composition according to the above (1), wherein the aromatic polyamide is a powder having an average particle size of 200 to 1,000 μm.

(6) The resin composition according to the above (1), wherein the compatibilizer for the aromatic polyamide and the polyphenylene ether is 0.05 to 5 parts by mass based on a total of 100 parts by mass of the aromatic polyamide and the polyphenylene ether.

(7) The resin composition according to the above (1), wherein the compatibilizer for the aromatic polyamide and the polyphenylene ether is maleic acid or an anhydride thereof.

(8) The resin composition according to the above (1), wherein based on the total content of the aromatic polyamide and the polyphenylene ether, the ratio of the aromatic polyamide is 40 to 80% by mass and the ratio of the polyphenylene ether is 20 to 60% by mass.

(9) The resin composition according to the above (1), further comprising 0.1 to 10% by mass of a conductivity imparting agent based on the total content of the resin composition.

(10) The resin composition according to the above (9), comprising 0.5 to 5 parts by mass of conductive carbon black as the conductivity imparting agent based on a total of 100 parts by mass of the aromatic polyamide and the polyphenylene ether.

(11) The resin composition according to the above (1), further comprising a reinforcing inorganic filler.

(12) The resin composition according to the above (11), wherein the reinforcing inorganic filler is a glass fiber bound by an epoxy compound.

(13) The resin composition according to the above (11), wherein the amount of the reinforcing inorganic filler is 10 to 60% by mass based on the total content of the resin composition.

(14) The resin composition according to the above (1), comprising 100 parts by mass or less of an aliphatic polyamide based on 100 parts by mass of the aromatic polyamide.

(15) The resin composition according to the above (14), wherein the aliphatic polyamide is one or more selected from the group consisting of aliphatic polyamides composed of an aliphatic diamine having 4 to 8 carbon atoms and an aliphatic dicarboxylic acid having 4 to 8 carbon atoms, aliphatic polyamides composed of a lactam having 6 to 8 carbon atoms, and aliphatic polyamides composed of an aminocarboxylic acid.

(16) The resin composition according to the above (15), wherein the aliphatic polyamide has a larger terminal amino group concentration than the terminal amino group concentration of the aromatic polyamide.

(17) The resin composition according to the above (1), further comprising 10 to 70 parts by mass of an impact modifier based on 100 parts by mass of the polyphenylene ether, the impact modifier being a block copolymer composed of a polymer block composed mainly of an aromatic vinyl compound and a polymer block composed mainly of a conjugated diene compound, wherein one of the blocks of the polymer block composed mainly of an aromatic vinyl compound in the block copolymer has a molecular weight in a range of 15,000 to 50,000.

(18) An SMT-applicable part comprising the resin composition according to the above (1).

(19) A film having a thickness of 1 to 200 μm, comprising a resin composition comprising 80 to 40 parts by mass of an aromatic polyamide composed of dicarboxylic acid units (a) containing 60 to 100% by mole of terephthalic acid units, and diamine units (b) containing 60 to 100% by mole of 1,9-nonamethylenediamine units (b-1) and/or 2-methyl-1,8-octamethylenediamine units (b-2), 20 to 60 parts by mass of polyphenylene ether, and 0.05 to 5 parts by mass of a compatibilizer for the polyamide and the polyphenylene ether, wherein the aromatic polyamide has a terminal amino group concentration of 5 μmol/g or more and 45 μmol/g or less.

(20) A semitransparent molding characterized by comprising a resin composition comprising 80 to 40 parts by mass of an aromatic polyamide composed of dicarboxylic acid units (a) containing 60 to 100% by mole of terephthalic acid units, and diamine units (b) containing 60 to 100% by mole of 1,9-nonamethylenediamine units (b-1) and/or 2-methyl-1,8-octamethylenediamine units (b-2), 20 to 60 parts by mass of polyphenylene ether, and 0.05 to 5 parts by mass of a compatibilizer for the polyamide and the polyphenylene ether, wherein the aromatic polyamide has a terminal amino group concentration of 5 μmol/g or more and 45 μmol/g or less, wherein the resin composition has a morphology with the polyphenylene ether in a dispersed phase and the aromatic polyamide in a continuous phase, and wherein the molding has a total light transmittance (JIS K7361-1) of 10% or more and a haze (JIS K7136) of 95% or less.

(21) A method for producing a resin composition comprising an aromatic polyamide composed of dicarboxylic acid units (a) containing 60 to 100% by mole of terephthalic acid units, and diamine units (b) containing 60 to 100% by mole of 1,9-nonamethylenediamine units (b-1) and/or 2-methyl-1,8-octamethylenediamine units (b-2), polyphenylene ether, a compatibilizer for the polyamide and the polyphenylene ether and a conductivity imparting agent, the method characterized by comprising the following steps in the stated order:

1) preparing a mixture of part of the aromatic polyamide and the conductivity imparting agent without melting them, feeding the mixture to the rest of the aromatic polyamide which is melted, and then melt-kneading the resultant mixture to produce a master pellet of the aromatic polyamide and the conductivity imparting agent;

2) melt-kneading the above-described master pellet with a melt-kneaded mixture of the above-described polyphenylene ether and the above-described compatibilizer for the polyamide and the polyphenylene ether to obtain a melt-kneaded mixture pellet; and 3) removing moisture from the melt-kneaded mixture pellet.

Advantages of the Invention

According to the present invention, a resin composition can be provided having excellent heat resistance, impact strength, low water absorbance, excellent fluidity and a low linear expansion coefficient, in which the weld strength is strong and cracking at pin push-in is substantially improved.

The above-described present invention and the various other objects, characteristics and advantages thereof will become clear from the following detailed description of the invention and the scope of claims.

BEST MODE FOR CARRYING OUT THE INVENTION

The respective components constituting the resin composition, film and conductive resin composition according to the present invention will now be described in more detail.

The polyamide used as an essential component in the present invention is an aromatic polyamide constituted from dicarboxylic acid units (a) and diamine units (b).

The dicarboxylic acid units (a) constituting the aromatic polyamide contain 60 to 100% by mole of terephthalic acid units. The content of terephthalic acid units in the dicarboxylic acid units (a) is preferably in the range of 75 to 100% by mole, more preferably in the range of 90 to 100% by mole, and most preferably, essentially all of the dicarboxylic acid units are terephthalic acid units. By making essentially all of the dicarboxylic acid units terephthalic acid units, the linear expansion coefficient of the polyamide-polyphenylene ether composition can be substantially reduced.

As described above, the dicarboxylic acid units (a) may include up to 40% by mole of dicarboxylic acid units other than terephthalic acid units. Examples of other dicarboxylic acid units in such a case include units derived from aliphatic dicarboxylic acids, such as malonic acid, dimethylmalonic acid, succinic acid, glutaric acid, adipic acid, 2-methyladipic acid, trimethyladipic acid, pimelic acid, 2,2-dimethylglutaric acid, 3,3-diethylsuccinic acid, azelaic acid, sebacic acid and suberic acid; alicyclic dicarboxylic acids, such as 1,3-cyclopentanedicarboxylic acid and 1,4-cyclohexanedicarboxylic acid; and aromatic dicarboxylic acids, such as isophthalic acid, 2,6-naphthalenedicarboxylic acid, 2,7-naphthalenedicarboxylic acid, 1,4-naphthalenedicarboxylic acid, 1,4-phenylenedioxydiacetic acid, 1,3-phenylenedioxydiacetic acid, diphenic acid, diphenylmethane-4,4'-dicarboxylic acid, diphenylsulfone-4,4'-dicarboxylic acid and 4,4'-biphenyldicarboxylic acid. These can be used singly or in combination. Among these, units derived from an aromatic dicarboxylic acid are preferred. Units derived from polyvalent carboxylic acids such as trimellitic acid, trimesic acid and pyromellitic acid may also be included to the extent that melt-molding of the composition is still possible.

The content of these other dicarboxylic acid units in the dicarboxylic acid units (a) is preferably 25% by mole or less, more preferably 10% by mole or less, and most preferably, essentially zero.

The diamine units (b) constituting the aromatic polyamide according to the present invention contain a total of 60 to 100% by mole of 1,9-nonamethylenediamine units (b-1) and 2-methyl-1,8-octamethylenediamine units (b-2).

The content of the 1,9-nonamethylenediamine units (b-1) and 2-methyl-1,8-octamethylenediamine units (b-2) in the diamine units (b) is more preferably 75 to 100% by mole, and even more preferably 90 to 100% by mole. Most preferably, essentially all of the diamine units are constituted by 1,9-nonamethylenediamine units (b-1) and 2-methyl-1,8-octamethylenediamine units (b-2). By making essentially all of the diamine units constituted by 1,9-nonamethylenediamine units (b-1) and 2-methyl-1,8-octamethylenediamine units (b-2), a foaming phenomenon during heating in the reflow furnace can be substantially suppressed.

In the present invention, the diamine units (b) in the aromatic polyamide may include up to 40% by mole of diamine units other than 1,9-nonamethylenediamine units and 2-methyl-1,8-octamethylenediamine units. Examples of other diamine units in such a case include units derived from aliphatic diamines such as ethylenediamine, propylenediamine, 1,4-butanediamine, 1,6-hexanediamine, 1,8-octamethylenediamine, 1,10-decanediamine, 1,12-dodecanediamine, 3-methyl-1,5-pentanediamine, 2,2,4-trimethyl-1,6-hexanediamine, 2,4,4-trimethyl-1,6-hexanediamine and 5-methyl-1,9-nonamethylenediamine; alicyclic diamines such as cyclohexanediamine, methylcyclohexanediamine and isophoronediamine; and aromatic diamines such as p-phenylenediamine, m-phenylenediamine, xylylenediamine, 4,4'-diaminodiphenylmethane, 4,4'-diaminodiphenylsulfone and 4,4'-diaminodiphenyl ether. These can be used singly or in combination. The content of these other diamine units in the diamine units (b) is more preferably 25% by mole or less, even more preferably 10% by mole or less, and most preferably zero.

Further, a preferred ratio of the 1,9-nonamethylenediamine units (b-1) with respect to the total content of 1,9-nonamethylenediamine units (b-1) and 2-methyl-1,8-octamethylenediamine units (b-2) in the diamine units is 60% by weight as a lower limit. A more preferred lower limit is 70% by weight, even more preferred is 75% by weight and most preferred is 80% by weight. By increasing the lower limit, heat resistance is increased and deformation during heating in the reflow furnace can be suppressed. A preferred upper limit is 100% by weight. More preferred is 95% by weight, and even more preferred is 90% by mass. By lowering the upper limit, mechanical properties such as impact resistance and tensile elongation are improved, and the advantageous effect of a substantial improvement in weld strength can be obtained.

One of the most important features of the present invention is the terminal amino group concentration of the aromatic polyamide. The terminal amino group concentration has an upper limit and a lower limit. To suppress reduction in weld strength and increase the strength against pin push-in, the lower limit of the terminal amino group concentration must be at least 5 µmol/g. A more preferred lower limit is 10 µmol/g, even more preferred is 12 µmol/g and most preferred is 15 µmol/g. To suppress deterioration in fluidity extremes, the upper limit must be 45 µmol/g. A preferred upper limit is 40 µmol/g, more preferred is 35 µmol/g and most preferred is 30 µmol/g.

In addition, while the terminal carboxyl group concentration of the aromatic polyamide is not especially limited, the lower limit is preferably 20 µmol/g, and more preferably 30 µmol/g. The upper limit is preferably 150 µmol/g, more preferably 100 µmol/g, and most preferably 80 µmol/g.

In the present invention, while the terminal carboxyl group concentration has not been found to have any connection by itself in influencing the characteristics of the composition, the ratio of terminal amino group concentration to terminal carboxyl group concentration (terminal amino group concentration/terminal carboxyl group concentration) has a large effect on mechanical properties, and so there is a preferred range of the ratio.

A preferred ratio of terminal amino group concentration to terminal carboxyl group concentration is 1.0 or less. More preferred is 0.9 or less, even more preferred is 0.8 or less and most preferred is 0.7 or less. Since this is a concentration ratio, there is no particular lower limit, although if the lower limit is set at 0.1 or more, it is easier to obtain a composition having excellent impact resistance and fluidity.

A method known in the art may be used for regulating these aromatic polyamide terminal group concentrations. Examples thereof include adding a terminal modifier, such as a diamine compound, a monoamine compound, a dicarboxylic acid compound, a monocarboxylic acid compound, an acid anhydride, a monoisocyanate, a monoacid halide, a monoester and a monoalcohol so as to have a certain terminal concentration during polymerization of the polyamide resin.

Specific examples of terminal modifiers which react with a terminal amino group include aliphatic monocarboxylic acids such as acetic acid, propionic acid, butyric acid, valeric acid, caproic acid, caprylic acid, lauric acid, tridecanoic acid, myristic acid, palmitic acid, stearic acid, pivalic acid and isobutyric acid; alicyclic monocarboxylic acids such as cyclohexanecarboxylic acid; aromatic monocarboxylic acids such as benzoic acid, toluic acid, α-naphthalenecarboxylic acid, β-naphthalenecarboxylic acid, methylnaphthalenecarboxylic acid and phenylacetic acid; and arbitrarily selected mixtures thereof. Of these, preferred are acetic acid, propionic acid, butyric acid, valeric acid, caproic acid, caprylic acid, lauric acid, tridecanoic acid, myristic acid, palmitic acid, stearic acid and benzoic acid, most preferably benzoic acid, in view of their reactivity, stability of the blocked terminal and cost.

Further, examples of terminal modifiers which react with a terminal carboxyl group include aliphatic monoamines such as methylamine, ethylamine, propylamine, butylamine, hexylamine, octylamine, decylamine, stearylamine, dimethylamine, diethylamine, dipropylamine and dibutylamine; alicyclic monoamines such as cyclohexylamine and dicyclohexylamine; aromatic monoamines such as aniline, toluidine, diphenylamine and naphthylamine; and arbitrarily selected mixtures thereof. Of these, most preferred are butylamine, hexylamine, octylamine, decylamine, stearylamine, cyclohexylamine and aniline, in view of their reactivity, boiling point, stability of the blocked terminal and cost.

For the reasons of precision and simplicity, these amino terminal group and carboxyl terminal group concentrations are preferably determined from the integrated values of the characteristic signals corresponding to the respective terminal groups by 1H-NMR. As a specific method, it is recommended to follow the method described in JP-A-7-228775. At this stage, heavy trifluoroacetic acid is effective as the measuring solvent. Further, as for the number of 1H-NMR integrations, at least 300 scans are necessary even when measuring with a device having adequate resolution. In addition, while a measuring method using titration, such as that described in JP-A-2003-055549, can also be employed, determination by 1H-NMR is more preferred as the influence of mixed additives, lubricants and the like is removed.

If the terminal group is regulated with a monoamine compound or a monocarboxylic acid compound, the active terminal becomes blocked. For example, if benzoic acid is used as a monocarboxylic acid compound, a terminal group blocked by a phenyl group terminal is produced. There are preferred upper and lower limits for the concentration of these blocked terminal groups. The lower limit is 20%, more preferably 40%, even more preferably 45% and most preferably 50%. The upper limit is 85%, more preferably 80% and most preferably 75%.

The terminal blocking ratio of the aromatic polyamide of the present invention can be determined according to the following formula (1) by measuring the respective number of terminal carboxyl groups, terminal amino groups and terminal groups which are blocked by the terminal blocking agent in the polyamide resin.

Terminal blocking ratio(%)=[($\alpha-\beta$)/$\alpha$]×100    (1)

In the formula, $\alpha$ represents the total number of terminal groups in the molecular chain (this is usually equal to twice the number of polyamide molecules), and $\beta$ represents the total number of carboxyl groups terminals and amino groups terminals which remain without being blocked.

One preferable mode of the present invention is to use together two or more aromatic polyamides having different terminal amino group concentrations. A specific examples is a mixture of an aromatic polyamide having a terminal amino group concentration exceeding 45 μmol/g and an aromatic polyamide having a terminal amino group concentration of 45 μmol/g or less. Even in this case, the average terminal amino group concentration of the mixed polyamide mixture must be within the scope of the claims of the present invention. The average terminal amino group concentration in this case of the polyamide mixture being mixed by a desired mixing ratio can be confirmed by determining the terminal amino group concentration of the polyamide mixture by 1H-NMR.

The aromatic polyamide according to the present invention has an intrinsic viscosity [η] measured at 30° C. in concentrated sulfuric acid in the range of preferably 0.6 to 2.0 dl/g, more preferably 0.7 to 1.4 dl/g, especially preferably 0.7 to 1.2 dl/g and most preferably 0.7 to 1.0 dl/g. Especially by using an aromatic polyamide having an intrinsic viscosity in the range indicated by the most preferred range, fluidity in the mold during injection molding can be substantially increased, and the appearance of a molded piece when an inorganic filler such as glass fiber is blended can be improved.

The term "intrinsic viscosity" used here means the same as what is usually called "limiting viscosity". A specific method for determining this is to measure the ηsp/c of plural measuring solvents having different concentrations in 96% concentrated sulfuric acid at a temperature of 30° C., derive the relational expression between the respective ηsp/c and concentration (c) and then extrapolate the concentration to zero. This value extrapolated to zero is the intrinsic viscosity.

Details of this are described in, for example, "Polymer Process Engineering" (Prentice-Hall, Inc., 1994) at pages 291 to 294.

From the perspective of accuracy, the number of "plural measuring solvents having different concentrations" at this stage is preferably at least 4. It is recommended that the preferably at least 4 viscosity measuring solutions preferably have concentrations of 0.05 g/dl, 0.1 g/dl, 0.2 g/dl and 0.4 g/dl.

The aromatic polyamide according to the present invention can be produced using any method known as a method for producing a crystalline polyamide. For example, solution polymerization or interfacial polymerization in which an acid chloride and a diamine are used as raw materials, or by melt polymerization, solid-phase polymerization, or melt extrusion polymerization in which a dicarboxylic acid and a diamine are used as raw materials. Especially, the production methods described in JP-A-7-228689 and JP-A-2000-103847 can be used.

One example of a specific method for producing the aromatic polyamide will now be described.

First, a catalyst and, optionally, a terminal blocking agent, are charged all at once into first a diamine and a dicarboxylic acid. After the polyamide salt is produced, a prepolymer having an intrinsic viscosity [η] of 0.10 to 0.60 dl/g at 30° C. in concentrated sulfuric acid is produced at a temperature of 200 to 250° C. and under a constant pressure. Next, the prepolymer is either subjected to further solid-phase polymerization or polymerized using a melt-extruder, whereby the aromatic polyamide can be easily obtained. Here, if the intrinsic viscosity [η] of the prepolymer is in the preferred range of 0.10 to 0.60 dl/g, in the subsequent polymerization there is little mismatch in the mole balance of the carboxyl groups and the amino groups and hardly any reduction in the polymerization rate, and the molecular distribution is also small, whereby an aromatic polyamide having excellent molding fluidity can be obtained. In the case of carrying out the final stage of polymerization by solid-phase polymerization, it is preferable to carry out this step under reduced pressure or under an inert gas flow. If the polymerization temperature is in the range of 200 to 280° C., the polymerization rate is large, productivity is excellent and coloration and gelation can be effectively suppressed, and thus such range is preferable. In the case of carrying out the final stage of polymerization with a melt-extruder, if the polymerization temperature is 370° C. or less, there is hardly any disintegration of the polyamide, whereby the aromatic polyamide can be obtained free from degradation, and thus such range is preferable.

Another method is to, after the prepolymer is produced, flash the prepolymer under atmospheric pressure to obtain a powdery aromatic polyamide prepolymer, and carry out solid-phase polymerization under reduced pressure or under an inert gas flow while flowing the powdery aromatic polyamide prepolymer using a stirrable apparatus.

In the present invention, the aromatic polyamide can achieve unexpected advantageous effects as a result of being powdery. Here, the term "powdery" means a polyamide powder having an average particle size in the range of 200 to 1,000 μm. A more preferred average particle size is 300 to 800 μm, and even more preferred is 400 to 700 μm. By using a powdery aromatic polyamide, the unexpected advantageous effect of a substantial reduction in resin temperature during extrusion processing can be achieved.

In the present invention, it is essential to include a crystal nucleating agent of the aromatic polyamide in the resin composition. The preferred amount has a lower and an upper limit.

A preferred lower limit is 0.001 parts by mass based on a total of 100 parts by mass of the aromatic polyamide and the polyphenylene ether. A more preferred lower limit is 0.01 parts by mass, an even more preferred lower limit is 0.02 parts by mass and a most preferred lower limit is 0.03 parts by mass.

A preferred upper limit is 5 parts by mass based on a total of 100 parts by mass of the aromatic polyamide and the polyphenylene ether. More preferred is 3 parts by mass, even more preferred is 2 parts by mass and most preferred is 1 part by mass.

Although the crystal nucleating agent is not especially limited, examples thereof include inorganic microparticles such as talc, silica, graphite and boron nitride; metal oxides such as magnesium oxide, aluminum oxide and zinc oxide; polyamide oligomers such as caprolactam dimers and the like. Among these, inorganic microparticles such as talc, silica and boron nitride are preferred, and talc is especially preferred. A preferable talc average particle size when talc is used for the crystal nucleating agent is 5 μm or less. More preferred is 4 μm or less, and most preferred is 3 μm or less. A lower limit is 0.1 μm.

By including such crystal nucleating agent, the water absorption of the resin composition can be substantially reduced. Further, the foaming phenomenon which occurs when a molded piece, such as a connector, composed of the resin composition according to the present invention absorbs water and is heated in a reflow furnace can be dramatically suppressed. In addition, while the reason is not understood, discoloration of the molded piece when it is overheated in the reflow furnace can be suppressed.

By including such crystal nucleating agent in the polyamide in advance, not only can the above-described advantageous effects be further increased, but the deflection temperature under load, which is an index for heat resistance, can also be improved, and is thus preferable. The method for including this crystal nucleating agent in the polyamide in advance is not especially limited, and examples include, but are not limited to, melt-kneading by a short screw extruder, a twin screw extruder, a kneader or the like, adding at the polymerization stage of the aromatic polyamide and forming a master batch by mixing with a forced mixer, such as a Henschel mixer, and then compressing.

Whether there are any advantageous effects as a crystal nucleating agent can be ascertained by measuring the crystallization peak temperature of the aromatic polyamide containing the crystal nucleating agent and the crystallization peak temperature of an aromatic polyamide not containing the crystal nucleating agent with a differential scanning calorimeter (DSC). A specific example of this method is to once heat a sample to a temperature at or higher than the melting point of the aromatic polyamide so that the sample melts, leave the mixture for at least 10 minutes, then cool the sample at a rate of decrease in temperature of 20° C./min, and measure the peak tops of the endothermic peaks observed during the cooling process. If the difference in temperature between the two peak tops is 2° C. or more, it can be judged that there is a crystal nucleating agent effect. Blending a crystal nucleating agent which has a crystal nucleating agent effect in an amount so that there is a temperature difference between peak tops of 5° C. or more is a more preferable embodiment.

The resin composition according to the present invention preferably contains a specified amount of phosphorus element in the resin composition. A preferred amount thereof is, based on a total of 100% by mass of the resin composition, 1 to 500 ppm in terms of phosphorus element in the resin composition, more preferred is 5 to 250 ppm in terms of phosphorus element and most preferred is 50 to 200 ppm in terms of phosphorus element.

To prevent the retention stability in the molding machine from deteriorating, the phosphorus element amount is preferably 1 ppm or more. To suppress deterioration in the fluidity (here, the fluidity during melt-flowing such as MVR) of the resin composition, the phosphorus element amount is preferably 500 ppm or less.

The phosphorus element in the present invention is preferably added as a phosphorus-element-containing compound containing one or more selected from a phosphoric acid compound, a phosphorous acid compound and a hypophosphorous acid compound, such as: 1) a phosphoric acid, a phosphorous acid and a hypophosphorous acid; 2) a metal phosphate, a metal phosphite and a metal hypophosphite; and 3) a phosphoric acid ester and a phosphorous acid ester.

Examples of the above-described 1) a phosphoric acid, a phosphorous acid and a hypophosphorous acid include phosphoric acid, phosphorous acid, hypophosphorous acid, pyrophosphorous acid, diphosphorous acid and the like.

Examples of the above-described 2) a metal phosphate, a metal phosphite and a metal hypophosphite include salts of periodic table Group 1 and Group 2 metals, manganese, zinc, aluminum, ammonia, alkylamines, cycloalkylamines, diamines and the like with the phosphorus compounds of the above-described 1). Examples of the above-described 3) a phosphoric acid ester and a phosphorous acid ester are represented by the following general formulae.

Phosphoric acid ester:$(OR)_n PO(OH)_{3-n}$

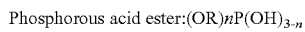

Phosphorous acid ester:$(OR)_n P(OH)_{3-n}$

Here, n denotes 1, 2 or 3, and R represents an alkyl group, a phenyl group or an alkyl group part of which is substituted with a hydrocarbon group and the like. When n is 2 or greater, the plural (RO) groups in the above-described formulae may be the same or different.

Examples of R include an aliphatic group such as a methyl group, an ethyl group, an n-propyl group, an n-butyl group, a t-butyl group, an n-hexyl group, a cyclohexyl group, an n-octyl group, a nonyl group, a decyl group, a stearyl group and an oleyl group; an aromatic group such as a phenyl group and a biphenyl group; or an aromatic group having a substituent such as a hydroxyl group, a methyl group, an ethyl group, a propyl group, a methoxy group and an ethoxy group.

Among these, preferred phosphorus compounds which can be added in the present invention are one or more selected from metal phosphates, metal phosphites and metal hypophosphites. Among those, preferred are salts of a phosphorus compound selected from a phosphoric acid, a phosphorous acid and a hypophosphorous acid and a metal selected from periodic table Group 1 and Group 2 metals, manganese, zinc and aluminum. More preferred are metal salts composed of a phosphorus compound selected from a phosphoric acid, a phosphorous acid and a hypophosphorous acid and a metal selected from periodic table Group 1 metals. Even more preferred are metal salts composed of a phosphorous acid or a hypophosphorous acid and a metal selected from periodic table Group 1 metals. Most preferred is sodium hypophosphite ($NaH_2PO_2$) or a hydrate ($NaH_2PO_2 \cdot nH_2O$) thereof.

Further, among the phosphoric acid esters, phenylphosphonic acid can be especially preferably used.

It is also more preferable to include such phosphorus-element-containing compound in the aromatic polyamide in advance. By including in the aromatic polyamide in advance, the balance between fluidity and impact resistance can be further increased. Examples of the method for including this phosphorus-element-containing compound in the aromatic polyamide in advance include adding the phosphorus-element-containing compound at the production stage of the aromatic polyamide and adding as a master pellet formed by melt-kneading the phosphorus-element-containing compound in the aromatic polyamide in advance.

In the case of including a phosphorus-element-containing compound in the aromatic polyamide in advance, the amount of the phosphorus-element-containing compound in the aromatic polyamide is, based on 100% by mass of the aromatic polyamide containing the phosphorus-element-containing compound, in terms of phosphorus element, preferably 1 to 500 ppm, more preferably 30 to 400 ppm and most preferably 150 to 400 ppm.

Quantification of the phosphorus element in the resin composition and in the aromatic polyamide may be carried out, for example, by high-frequency inductively-coupled plasma (ICP) emission analysis at a wavelength of 213.618 (nm) using, as a measuring apparatus, an IRIS/IP manufactured by Thermo Jarrell Ash Corp.

Further, to improve the heat resistance stability of the polyamide in the present invention, the metal stabilizers described in JP-A-1-163262 can also be used without any problem.

Among these metal stabilizers, examples include CuI, $CuCl_2$, copper acetate, cerium stearate and the like, and more preferred are copper compounds as typified by CuI, copper acetate and the like. Even more preferred is CuI.

A preferred blended amount of such copper compound is, based on a total of 100% by mass of the resin composition, in terms of copper element, preferably 1 to 200 ppm, more preferably 1 to 100 ppm and even more preferably 1 to 30 ppm.

Quantification of the copper element may be carried out as the quantification of the phosphorus element, for example, by high-frequency inductively-coupled plasma (ICP) emission analysis using an apparatus IRIS/IP manufactured by Thermo Jarrell Ash Corp.

Further, an alkyl-metal halide typified by potassium iodide, potassium boride and the like, may also be preferably used. It is preferable to add the copper compound together with the alkyl-metal halide.

Obviously, polyamides other than an aromatic polyamide may also be added to the resin composition according to the present invention to the extent that the objects of the present invention is not hindered.

Here, examples of polyamides other than an aromatic polyamide which may be added include aliphatic polyamides. Specific examples include one or more aliphatic polyamides selected from aliphatic polyamides composed of an aliphatic diamine having 4 to 8 carbon atoms and an aliphatic dicarboxylic acid having 4 to 8 carbon atoms, aliphatic polyamides composed of a lactam having 6 to 8 carbon atoms, or aliphatic polyamides composed of an aminocarboxylic acid.

More specifically, such examples include polyamide 6, polyamide 6,6, polyamide 6/6,6, polyamide 11, polyamide 12, polyamide 4,6, polyamide 6,10, polyamide 6,12, polyamide 6/6,6, polyamide 6/6,12 and the like. Aliphatic polyamides formed by copolymerization of plural polyamides with an extruder or the like may also be used. Preferred aliphatic polyamides are one or more selected from polyamide 6, polyamide 6,6, polyamide 4,6, polyamide 11 and polyamide 12. The most preferred polyamides among these are polyamide 6, polyamide 6,6, or a mixture of these two.

A preferred blended amount of such aliphatic polyamide is, based on 100% by mass of the aromatic polyamide, 100 parts by mass or less. More preferred is 80 parts by mass or less, even more preferred is 50 parts by mass or less and most preferred is 30 parts by mass or less.

Further, at this stage, the terminal amino group concentration of the aliphatic polyamide is preferably larger than the terminal amino group concentration of the aromatic polyamide. If the aromatic polyamide is a mixture, this refers to the average terminal amino group concentration of those aromatic polyamides.

By blending a small amount of aliphatic polyamide, although heat resistance is decreased to a small degree, the balance between mechanical properties (impact strength and tensile elongation) and fluidity can be increased to an even higher level.

Further, in the present invention, other additives or the like known in the art capable of being added to the polyamide may also be added in an amount of not more than 10 parts by mass based on 100 parts by mass of polyamide.

Next, the polyphenylene ether which can be used in the present invention will be described in more detail.

The "polyphenylene ether which can be used in the present invention" is a single polymer and/or copolymer having a repeating structural unit represented by the following formula (1),

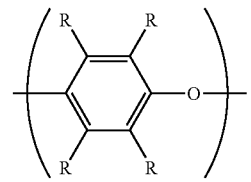

wherein O denotes an oxygen atom, and each R independently represents hydrogen, halogen, a primary or secondary C1-C7 alkyl group, a phenyl group, C1-C7 haloalkyl group, C1-C7 aminoalkyl group, C1-C7 hydrocarbyloxy group or halohydrocarbyloxy group (in which the halogen atom and the oxygen atom are separated from each other by at least two carbon atoms).

Specific examples of the polyphenylene ether according to the present invention include poly(2,6-dimethyl-1,4-phenylene ether), poly(2-methyl-6-ethyl-1,4-phenylene ether), poly(2-methyl-6-phenyl-1,4-phenylene ether), poly(2,6-dichloro-1,4-phenylene ether) and the like. Additional examples include polyphenylene ether copolymers, such as a copolymer of 2,6-dimethylphenol and another phenol (for example, a copolymer of 2,3,6-trimethylphenol and a copolymer of 2-methyl-6-butylphenol as described in JP-B-52-17880).

Among these, especially preferred polyphenylene ethers include poly(2,6-dimethyl-1,4-phenylene ether), a copolymer of 2,6-dimethyl-1,4-phenol and 2,3,6-trimethyl-1,4-phenol and a mixture thereof.

Further, as to the ratio of the respective monomer units in the case of using a copolymer of 2,6-dimethyl-1,4-phenol and 2,3,6-trimethyl-1,4-phenol, preferred is a copolymer comprising 10 to 30% by mass of 2,3,6-trimethyl-1,4-phenol based on a total of 100% by mass of the polyphenylene ether copolymer. More preferred is 15 to 25% by mass, and most preferred is 20 to 25% by mass.

Further, a preferred molecular weight distribution (weight average molecular weight/number average molecular weight (Mw/Mn)) of a copolymer of 2,6-dimethyl-1,4-phenol and 2,3,6-trimethyl-1,4-phenol is in the range of 2.5 to 4.0. More preferred is in the range of 2.8 to 3.8, and most preferred is in the range of 3.0 to 3.5.

The method for producing the polyphenylene ether used in the present invention is not especially limited so long as it is known in the art. Examples thereof include the production methods described in U.S. Pat. Nos. 3,306,874, 3,306,875, 3,257,357 and 3,257,358, JP-A-50-51197, JP-A-52-17880 and JP-A-63-152628.

The polyphenylene ether which can be used in the present invention has a reduced viscosity ($\eta$sp/c: measured in a 0.5 g/dl chloroform solution at 30° C.) preferably in the range of 0.15 to 0.70 dl/g, more preferably in the range of 0.20 to 0.60 dl/g, and even more preferably in the range of 0.40 to 0.55 dl/g.

In the present invention, a mixture of two or more polyphenylene ethers having different reduced viscosities can be used without any problem. Examples thereof include, but are not limited to, a mixture of a polyphenylene ether having a reduced viscosity of 0.45 dl/g or less and a polyphenylene ether having a reduced viscosity of 0.50 dl/g or more, and a mixture of a low molecular weight polyphenylene ether having a reduced viscosity of 0.40 dl/g or less and a polyphenylene ether having a reduced viscosity of 0.50 dl/g or more.

Further, various stabilizers known in the art can be preferably used for stabilizing the polyphenylene ether. Examples of the stabilizer include metal stabilizers such as zinc oxide and zinc sulfide, and organic stabilizers such as a hindered phenol stabilizer, a phosphate ester stabilizer and a hindered amine type stabilizer. A preferred blended amount of such compound is not more than 5 parts by mass based on 100 parts by mass of the polyphenylene ether.

Further, other additives or the like known in the art capable of being added to the polyphenylene ether may also be added in an amount of not more than 10 parts by mass based on 100 parts by mass of polyphenylene ether.

In the present invention, a preferred mass ratio between the aromatic polyamide and the polyphenylene ether is 20 to 90 parts by mass of aromatic polyamide to 10 to 80 parts by mass of polyphenylene ether (here, the total content of the aromatic polyamide and the polyphenylene ether is 100 parts by mass). More preferred is 30 to 80 parts by mass of aromatic polyamide to 20 to 70 parts by mass of polyphenylene ether, even more preferred is 40 to 80 parts by mass of aromatic polyamide to 20 to 60 parts by mass of polyphenylene ether, and most preferred is 50 to 65 parts by mass of aromatic polyamide to 35 to 50 parts by mass of polyphenylene ether.

A preferred dispersed configuration in the present invention is for the aromatic polyamide to form the continuous phase and the polyphenylene ether (PPE) to form the dispersed phase. Especially preferred is, when observed with a transmission electron microscope, the polyphenylene ether particles are present as the dispersed phase having an average particle size of 0.1 to 5 µm. More preferred is in the range of 0.3 to 3 µm, and most preferred is 0.5 to 2 µm.

The average particle size of the PPE dispersed particles in the present invention can be determined by electron photomicrography, and calculated in the following manner. Specifically, a transmission electron microscope photograph (5,000 times) of an ultra-thinly cut specimen cut from a pellet or molded article is taken, and the dispersed particle size di and particle number ni are determined for calculating the number average particle size of the PPE dispersed particles (=Σdini/Σni).

In this case, if the particle shape cannot be deemed to be spherical, the minor axis and the major axis of the particles are measured, and the particle size is taken as half of the sum thereof. For calculating the average particle size, the particle size of at least 1,000 particles has to be measured.

The compatibilizer for the polyamide and the polyphenylene ether used in the present invention will now be described.

In the present invention, the compatibilizer for the polyamide and the polyphenylene ether is an essential component. Examples of the compatibilizer which can be used are described in detail in WO01/81473.

Among those compatibilizers, preferred examples include one or more selected from maleic acid, fumaric acid, citric acid and mixtures thereof. Especially preferred are maleic acid and/or an anhydride thereof. Especially by selecting maleic acid and/or anhydride thereof as the compatibilizer, the weld strength of the resin composition can be dramatically improved, and the advantageous effects of an improvement in the glossiness (gloss value) of the molded piece surface can be seen.

The amount of compatibilizer for the polyamide and the polyphenylene ether in the present invention is preferably in the range of 0.01 to 8 parts by mass, more preferably 0.05 to 5 parts by mass, and even more preferably from 0.1 to 3 parts by mass based on a total of 100 parts by mass of the aromatic polyamide and the polyphenylene ether.

To prevent the impact resistance of the resin composition from decreasing, the amount of compatibilizer is preferably not less than 0.01, and to suppress deterioration of the fluidity in the mold (spiral flow distance) during injection molding, the amount is preferably not greater than 8 parts by mass.

In addition, to further improve impact resistance, an impact modifier may be added to the resin composition according to the present invention in an amount of 10 to 70 parts by mass based on 100 parts by mass of the polyphenylene ether.

Examples of the impact modifier which can be used in the present invention include one or more selected from the group consisting of a block copolymer and hydrogenation product thereof composed of at least one polymer block composed mainly of an aromatic vinyl compound and at least one polymer block composed mainly of a conjugated diene compound, and an ethylene-α-olefin copolymer.

The term "composed mainly of" in the expression "polymer block composed mainly of an aromatic vinyl compound" in the present invention means a block in which at least 50% by mass or more of the block is an aromatic vinyl compound. More preferred is 70% by mass or more, even more preferred is 80% by mass or more and most preferred is 90% by mass or more.

Similarly, the term "composed mainly of" in the expression "polymer block composed mainly of a conjugated diene compound" means a block in which at least 50% by mass or more is a conjugated diene compound. More preferred is 70% by mass or more, even more preferred is 80% by mass or more and most preferred is 90% by mass or more.

Here, even if a small amount of a conjugated diene compound or some other compound is randomly linked to the aromatic vinyl compound, so long as 50% by mass or more of the block is formed from an aromatic vinyl compound, the compound is considered to be a block copolymer composed mainly of an aromatic vinyl compound. This is the same also for the conjugated diene compound.

Specific examples of the aromatic vinyl compound include styrene, α-methyl styrene, vinyl toluene and the like. While one or more compounds selected from these can be used, among them styrene is especially preferred.

Specific examples of the conjugated diene compound include butadiene, isoprene, piperylene, 1,3-pentadiene and the like. While one or more compounds selected from these can be used, among them butadiene, isoprene and a mixture thereof are preferred.

The microstructure of the conjugated diene compound block moiety of the block copolymer preferably has a 1,2-vinyl content or a total content of 1,2-vinyl and 3,4-vinyl of 5 to 80%, more preferably 10 to 50% and most preferably 15 to 40%.

It is preferred that the block copolymer according to the present invention has a bonding configuration selected from A-B, A-B-A or A-B-A-B, wherein "A" represents a polymer block composed mainly of an aromatic vinyl compound and "B" represents a polymer block composed mainly of a conjugated diene compound. The bonding configuration may also be a mixture of these. Among these configurations, A-B-A, A-B-A-B or a mixture of these are more preferred, and A-B-A is most preferred.

Further, it is preferred that the block polymers of the aromatic vinyl compound and the conjugated diene compound which can be used in the present invention are hydrogenated block copolymers. The term "hydrogenated block copolymer" means a copolymer which is obtained by hydrogenating the above-described block polymers of the aromatic vinyl compound and the conjugated diene compound so that the degree of aliphatic double bonds of the polymer block composed mainly of a conjugated diene compound has been controlled to be in the range of more than 0 and up to 100%. A preferred degree of hydrogenation of the hydrogenated block copolymer is 80% or more, and most preferred is 98% or more.

Such block copolymer can also be used as a mixture of an unhydrogenated block copolymer and a hydrogenated block copolymer without any problem.

Further, so long as it does not go against the intent of the present invention, such aromatic vinyl compound-conjugated diene compound block copolymer may also be used as a mixture having different bonding configurations, different aromatic vinyl compounds, different conjugated diene compounds, different total contents of the 1,2-bond vinyl content and 3,4-bond vinyl content, and different contents of the aromatic vinyl compound components.

As the block copolymer used in the present invention, a mixture of a low molecular weight block copolymer and a high molecular weight block copolymer can be preferably used. Specifically, it is preferred to use a mixture of a low molecular weight block copolymer having a number average molecular weight of less than 120,000, and a high molecular weight block copolymer having a number average molecular weight of 120,000 or more. More preferred is a mixture of a low molecular weight block copolymer having a number average molecular weight of less than 120,000, and a high molecular weight block copolymer having a number average molecular weight of 170,000 or more.

The number average molecular weight of the respective block copolymers is the number average molecular weight calculated with respect to standard polystyrene by measuring with an ultraviolet spectrometric detector using a gel permeation chromatography (GPC) measuring apparatus. At this stage, low molecular weight components resulting from catalyst deactivation during polymerization are sometimes detected, however such low molecular weight components are not included in the molecular weight calculation.

Further, one of the polymer blocks mainly composed of an aromatic vinyl compound in the block copolymer preferably has a molecular weight in the range of 15,000 to 50,000.

The number average molecular weight of one of the polymer blocks composed mainly of an aromatic vinyl compound of one block copolymer can be determined by the following formula using the above-described block copolymer number average molecular weight.

$$Mn(a),n = \{Mn \times a/(a+b)\}/N(a) \quad (3)$$

In the above formula, Mn(a), n represents the number average molecular weight of one of the polymer blocks composed mainly of an aromatic vinyl compound of block copolymer n, Mn represents the number average molecular weight of the block copolymer n, a represents the % by mass of the polymer blocks composed mainly of an aromatic vinyl compound in the block copolymer n, b represents the % by mass of the polymer blocks composed mainly of a conjugated diene compound in the block copolymer n, and N(a) represents the number of polymer blocks composed mainly of an aromatic vinyl compound in the block copolymer n.

The mass ratio between such low molecular weight block copolymer and high molecular weight block copolymer (low molecular weight block copolymer/high molecular weight block copolymer) is 95/5 to 5/95, and is preferably 90/10 to 10/90.

As the block copolymer used in the present invention, a mixture of two or more block copolymers constituted from a block copolymer containing 55% by mass or more and less than 90% by mass of polymer blocks composed mainly of an aromatic vinyl compound and a block copolymer containing 20% by mass or more and less than 55% of polymer blocks composed mainly of an aromatic vinyl compound may also be preferably used.

Especially when using only a block copolymer containing 55% by mass or more and less than 90% of polymer blocks composed mainly of an aromatic vinyl compound as the block copolymer, a transparent resin composition can be obtained which also has high impact resistance.

Further, the block copolymer used in the present invention may be a completely-modified block copolymer or a mixture of an unmodified block copolymer and a modified block copolymer.

The term "modified block copolymer" mentioned here means a block copolymer which is modified by at least one kind of modifying compound having in the molecular structure at least one carbon-carbon double bond or carbon-carbon triple bond and at least one carboxylic acid group, acid anhydride group, amino group, hydroxyl group or glycidyl group.

As the at least one kind of modifying compound mentioned here having in the molecule at least one carbon-carbon double bond or carbon-carbon triple bond and at least one carboxylic acid group, acid anhydride group, amino group, hydroxyl group or glycidyl group, the same modified compound as those described for the modified polyphenylene ether may be used.

The blended amount of the impact modifier in the present invention is preferably not greater than 50 parts by mass based on a total of 100 parts by mass of the aromatic polyamide and the polyphenylene ether. From the standpoint of heat resistance and fluidity, 1 to 35 parts by mass is more preferred, and most preferred is 3 to 30 parts by mass.

The resin composition according to the present invention may also contain a styrene polymer. Examples of a styrene polymer as mentioned in the present invention include homopolystyrene, a rubber-modified polystyrene (HIPS), a styrene-acrylonitrile copolymer (AS resin) and a styrene-rubber polymer-acrylonitrile copolymer (ABS resin). By including a styrene polymer, not only can the objects of the present invention be achieved, but weatherability can also be improved. A preferred blended amount of the styrene polymer is not greater than 50 parts by mass based on a total of 100 parts by mass of the polyamide and the polyphenylene ether.

Further, in the resin composition according to the present invention, an reinforcing inorganic filler may also be added. Examples of reinforcing inorganic fillers which can be used in the present invention include glass fiber, wollastonite, talc, kaolin, xonotlite, titanium oxide, potassium titanate, calcium carbonate, zinc oxide and the like. Among these, preferred are glass fiber, wollastonite, talc, clay, titanium oxide and zinc oxide, and more preferred are glass fiber, wollastonite, talc and titanium oxide. Examples of even more preferred reinforcing inorganic fillers include one or more selected from talc, mica, wollastonite, glass fiber, carbon fiber and calcium carbonate.

The wollastonite which can be used in the present invention will now be described in more detail.

The wollastonite which can be used in the present invention is a material obtained by purifying, pulverizing and classifying a natural mineral composed of calcium silicate. Alternatively, synthetic wollastonite may be used. The wollastonite preferably has a size such that average particle diameter is 2 to 9 μm and aspect ratio is 5 or more. More preferred is an average particle size of 3 to 7 μm and an aspect ratio of 5 or more, and even more preferred is an average particle size of 3 to 7 μm and an aspect ratio of 8 or more to 30 or less.

Next, the talc which can be used in the present invention will be described in more detail.

Talc which can be preferably used in the present invention is a material obtained by purifying, pulverizing and classifying a natural mineral composed of magnesium silicate. Further, the crystal grain size of the talc (002) diffraction plane according to wide-angle X-ray diffraction is preferably 570 Å or more.

Here, the "talc (002) diffraction plane" can be confirmed by identifying the presence of talc $Mg_3Si_4O_{10}(OH)_2$ using a wide-angle X-ray diffraction apparatus and matching the interlayer distances thereof to about 9.39 Å which is the lattice spacing according to the talc (002) diffraction plane. The crystal grain size of the talc (002) diffraction plane can also be calculated from the half-width of the peak thereof.

A preferred shape has an average particle size of 1 μm or more to 20 μm or less, and a particle size distribution of the ratio (d75%/d25%) between the 25% particle size (d25%) to the 75% particle size (d75%), from the smaller particle sizes, of 1.0 or more to 2.5 or less. More preferred is a (d75%/d25%) of 1.5 or more to 2.2 or less.

A preferred average particle size of the talc is 1 μm or more to 16 μm or less, and more preferred is more than 3 μm to less than 9 μm.

The average particle size and particle size distribution of the talc as mentioned here is the volume standard particle size measured using a laser diffraction/scattering particle size distribution analyzer. Further, this is a value measured using ethanol as the talc dispersion solvent.

Examples of the carbon fiber which can be preferably used in the present invention include polyacrylonitrile carbon fiber, rayon carbon fiber, lignin carbon fiber, pitch carbon fiber and the like. These may be used alone or in combination of two or more. A preferred fiber diameter is 5 to 20 μm and more preferred is 5 to 13 μm. The aspect ratio is preferably 10 or more.

As the glass fiber which can be preferably used in the present invention, chopped strands having a fiber diameter of 5 μm to 20 μm are preferable from the standpoint of mechanical properties and handleability. A more preferred fiber diameter is 8 μm to 15 μm.

Further, these reinforcing inorganic fillers may be optionally treated with a surface treatment agent, such as a higher fatty acid or derivative such as ester or salt thereof (such as stearic acid, oleic acid, palmitic acid, magnesium stearate, calcium stearate, aluminum stearate, stearic acid amide and ethyl stearate) and a coupling agent (such as a silane, titanate, aluminum and zirconium coupling agent). The used amount of such surface treatment agent is 0.05 to 5 parts by mass, and more preferably 0.1 to 2 parts by mass, based on 100 parts by mass of the reinforcing inorganic filler.

A preferred amount of the reinforcing inorganic filler is 10 to 60% by mass based on a total of 100 parts by mass of the resin composition. More preferred is 15 to 50% by mass, and even more preferred is 18 to 45% by mass.

These reinforcing inorganic fillers may be bound by a binding agent to increase handleability or to improve adhesion with the resin. Preferred examples of a binding agent which can be used here include epoxy, urethane, urethane/maleic acid modified and urethane/amine modified compounds. Obviously, these binding agents can be used together. Further, among the above examples, an epoxy compound having plural epoxy groups in its molecular structure can be especially preferably used. Among epoxy compounds, novolac compounds are especially preferred.

By using an epoxy compound having plural epoxy groups in its molecular structure as the binding agent, water absorbance can be reduced, and reflow furnace heat resistance can be improved.

Although the reinforcing inorganic filler in the present invention can be added at any stage from the polymerization stage of the polyamide and the polyphenylene ether to the molding stage of the resin composition, it is preferable to add at the resin composition extrusion step and molding step (including dry blends) stages.

A specific example includes a method of adding the reinforcing inorganic filler into the melted resin composition in the extrusion step, and then melt-kneading. It is also effective to add in the form of a master batch by blending the reinforcing inorganic filler in the polyamide and the polyphenylene ether in advance. There are no restrictions on the method for preparing the master batch at this stage. Methods which can be preferably used include mixing the polyamide and the polyphenylene ether without melting them, and then melt-kneading with an extruder and the like; and adding the reinforcing inorganic filler into melted polyamide or polyphenylene ether. Especially when the reinforcing inorganic filler is a fibrous filler, the method of adding into melted polyamide or polyphenylene ether and then melt-kneading is more preferable.

In the present invention, a conductivity imparting agent can further be included. The blended amount of the conductivity imparting agent in such case is 0.1 to 10% by mass, more preferably 0.5 to 5% by mass and most preferably 1 to 3% by mass, based on a total of 100 parts by mass of the resin composition.

Preferred conductivity imparting agents in such case are one or more selected from the group consisting of conductive carbon black, graphite and a carbon fibril.

When conductive carbon black is used as the conductivity imparting agent in the present invention, preferred examples of the conductive carbon black have a dibutyl phthalate (DBP) oil absorption value of 250 mL/100 g or more. More preferably, the conductive carbon black has a DBP oil absorption value of 300 mL/100 g or more, and still more preferably of 350 mL/100 g or more. The DBP oil absorption mentioned here is a value measured by a method specified in ASTM D2414.

Further, the conductive carbon black which can be used in the present invention is preferably a carbon black having a BET specific surface area (JIS K6221-1982) of 200 $m^2$/g or more, and more preferably 400 $m^2$/g or more. Examples of such conductive carbon blacks which are commercially available include Ketjen black EC and a Ketjen black EC-600JD, which can be purchased from Ketjen Black International Co., Ltd.

Examples of carbon fibrils which can be used as the conductivity imparting agent in the present invention include carbonaceous fibers having a hollow structure with an average fiber diameter of less than 75 nm and few branches, such as those described in U.S. Pat. Nos. 4,663,230, 5,165,909, 5,171,560, 5,578,543, 5,589,152, 5,650,370, and 6,235,674. Further, the carbon fibril may be in the form of a coil having a coil pitch of 1 μm or less. Examples of commercially available carbon fibrils include the carbon fibril (BN fibril) which can be purchased from Hyperion Catalysis International.

Examples of graphite which can be used as the conductivity imparting agent in the present invention include obvious materials obtained by heating anthracite, pitch and the like at a high temperature in an arc furnace, as well as naturally-produced black lead. A preferred weight average particle size is 0.1 to 50 μm, and more preferred is 1 to 30 μm.

While the method for adding such conductivity imparting agent is not especially limited, examples thereof include adding the conductivity imparting agent into a melted mixture of the aromatic polyamide and the polyphenylene ether and then melt-kneading, and adding in the form of a master batch by blending the conductivity imparting agent in the aromatic polyamide in advance. Adding in the form of a master batch by blending the conductivity imparting agent in the aromatic polyamide is especially preferable.

If carbon fibrils are used as the conductivity imparting agent, a polyamide/carbon fibril master batch which can be purchased from Hyperion Catalysis International may be used as the master batch.

The amount of conductivity imparting agent in such a master batch is preferably 5 to 25% by mass based on 100% by mass of the master batch. A preferred amount of conductivity imparting agent in the master batch when conductive carbon black is used as the conductivity imparting agent is 5 to 15% by mass, and more preferably 8 to 12% by mass. Further, a preferred amount of conductivity imparting agent in the master batch when graphite or carbon fibrils is used as the conductivity imparting agent is 15 to 25% by mass, and more preferably 18 to 23% by mass.

Examples of the resin used in the conductivity imparting agent master batch include one or more selected from the polyamide, polyphenylene ether and impact modifier. Especially preferable is the polyamide. At this stage, an aromatic polyamide is more preferred as the used polyamide, and a preferred viscosity thereof preferably has an intrinsic viscosity [η] in the range of 0.7 to 1.1 dl/g. By using an aromatic polyamide having an intrinsic viscosity in this range, efficiency during master batch production can be improved (increase in production per unit time), and the dart impact strength of the resin composition obtained using this master batch can be increased.

The aromatic polyamide fed into the master batch can achieve unexpected advantageous effects as a result of being powdery. Here, the term "powdery aromatic polyamide" means a polyamide powder having an average particle size in the range of 200 to 1,000 μm. By using a powdery aromatic polyamide, the unexpected effect of a substantial reduction in resin temperature during extrusion processing can be achieved.

While the method for producing such conductive master batch is not especially limited, examples thereof include: (1) mixing the aromatic polyamide and the conductivity imparting agent without melting them, and then melt-kneading with the resin temperature at a temperature at or higher than the melting point of the aromatic polyamide; (2) adding the conductivity imparting agent into melted aromatic polyamide and then melt-kneading; (3) preparing a mixture of part of the aromatic polyamide and the conductivity imparting agent without melting them, feeding the mixture to the rest of the aromatic polyamide, which is melted, and then melt-kneading; and (4) feeding the conductivity imparting agent to melted aromatic polyamide, melt-kneading the mixture, then further feeding the aromatic polyamide and melt-kneading the resultant mixture.

Among these, the most preferred method is (3) preparing a mixture of part of the aromatic polyamide and the conductivity imparting agent without melting them, feeding the mixture to the rest of the aromatic polyamide, which is melted, and then melt-kneading.

By employing this preferred production method, the resin temperature during production of the conductive master batch can be substantially reduced, which is very effective in suppressing mold deposits (hereinafter in the present specification sometimes abbreviated as "MD") after formation of the conductive resin composition.

The above-described methods will now be described with reference to specific examples.

(1) Using a twin screw extruder with one feed opening in the upstream of the extruder, a mixture of the aromatic polyamide and the conductivity imparting agent is fed from the upstream feed opening, and the resultant mixture is melt-kneaded at a temperature at or higher than the melting point of the aromatic polyamide.

(2) Using a twin screw extruder with one feed opening in the upstream and one feed opening in the downstream of the extruder, the aromatic polyamide is fed from the upstream feed opening, the resultant mixture is melt-kneaded at a temperature at or higher than the melting point of the aromatic polyamide, then the conductivity imparting agent is added from the downstream feed opening and the resultant mixture is further melt-kneaded.

(3) Using a twin screw extruder with one feed opening in the upstream and one feed opening in the downstream of the extruder, part of the aromatic polyamide is fed from the upstream feed opening, the resultant mixture is melt-kneaded at a temperature at or higher than the melting point of the aromatic polyamide, a mixture of the rest of the polyamide and the conductivity imparting agent mixed without melting them is added from the downstream feed opening and then the resultant mixture is further melt-kneaded.

(4) Using a twin screw extruder with one feed opening in the upstream, one feed opening in the middle and one feed opening in the downstream of the extruder, the aromatic polyamide is fed from the upstream feed opening, the resultant mixture is melt-kneaded at a temperature at or higher than the melting point of the aromatic polyamide, the conductivity imparting agent is added from the middle feed opening and the resultant mixture is further melt-kneaded, the aromatic polyamide is added from the downstream feed opening and then the resultant mixture is further melt-kneaded.

Among these, an especially preferred method is the production method of (3).

Further, the cylinder setting temperature of the processing machine during production of such master batch is not especially limited, and there are no problems so long as the temperature is at or higher than the melting point of the aromatic polyamide, as described above. However, a preferred range is in the range of 290 to 350° C., and more preferred is in the range of 300 to 330° C.

When producing a conductive resin composition by adding a conductivity imparting agent to the resin composition according to the present invention, a preferred production method comprises the following steps in the following order:

(1) preparing a mixture of part of the aromatic polyamide and the conductivity imparting agent without melting them, feeding the mixture to the rest of the aromatic polyamide, which is melted, and then melt-kneading the resultant mixture to produce a master pellet of the aromatic polyamide and the conductivity imparting agent;

(2) melt-kneading the above-described master pellet with a melt-kneaded mixture of the above-described polyphenylene ether and the above-described compatibilizer for the polyamide and the polyphenylene ether to obtain a melt-kneaded mixture pellet; and (3) removing moisture from the melt-kneaded mixture pellet.

By performing the above-described steps in the above-described order, MD during injection molding of the conductive resin composition can be suppressed, the occurrence of silver streaks can be suppressed and the generation of gum in the die lip portion during sheet extrusion can be suppressed.

At this stage, as described above, by using a powdery aromatic polyamide for the aromatic polyamide, these advantageous effects can be further increased.

A flame retardant may be added to the resin composition according to the present invention. Examples of preferred usable flame retardants include phosphate compounds, phosphazene compounds, phosphinates and the like. Among these, phosphinates are especially preferred.

Specific examples of preferred phosphinates will now be described.

Phosphinates which can be preferably used in the present invention are diphosphinates represented by the following formula (I) and/or formula (II), or condensate thereof (in the present specification, all of such compounds are abbreviated as "phosphinates").

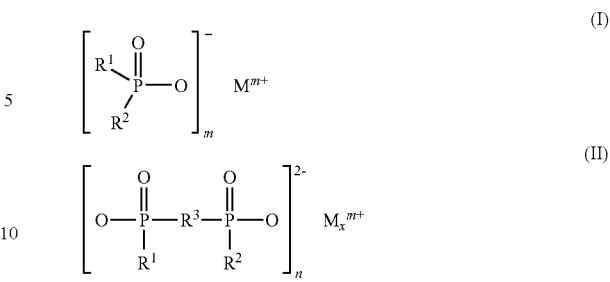

In the formula, $R^1$ and $R^2$ may be the same or different, and represent a linear or branched $C^1$ to $C^6$ alkyl and/or aryl or phenyl, $R^3$ represents a linear or branched $C^1$ to $C^{10}$ alkylene, $C^6$ to $C^{10}$ arylene, $C^6$ to $C^{10}$ alkylarylene or $C^6$ to $C^{10}$ arylalkylene, M denotes one or more selected from calcium (ion), magnesium (ion), aluminum (ion), zinc (ion), bismuth (ion), manganese (ion), sodium (ion), potassium (ion) and a protonated nitrogen base, m is 2 or 3, n is 1 to 3 and x is 1 or 2.

As described in EP 699708 and JP-A-08-73720, these are produced in aqueous solution using a phosphinic acid and a metal carbonate, metal hydroxide, or metal oxide.

While such phosphinates are essentially monomeric compounds, depending on the reaction conditions, polymeric phosphinates which are condensates having a degree of condensation of 1 to 3 are also included depending on the environment.

From the standpoint of exhibiting even higher flame retardance and suppression of MD occurrence, the phosphinates which can be used in the present invention preferably contain 90% by mass or more, more preferably 95% by mass or more and most preferably 98% by mass or more, of the phosphinate represented by the following formula (I).

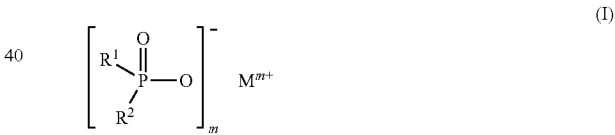

In the formula, $R^1$ and $R^2$ may be the same or different, and represent a linear or branched $C^1$ to $C^6$ alkyl and/or aryl or phenyl, M denotes one or more selected from calcium (ion), magnesium (ion), aluminum (ion), zinc (ion), bismuth (ion), manganese (ion), sodium (ion), potassium (ion) and a protonated nitrogen base, and m is 2 or 3.

In the present invention, specific examples of the phosphinic acids which can be preferably used include dimethylphosphinic acid, ethylmethylphosphinic acid, diethylphosphinic acid, methyl-n-propylphosphinic acid, methanedi (methylphosphinic acid), benzene-1,4-(dimethylphosphinic acid), methylphenylphosphinic acid, diphenylphosphinic acid and mixtures thereof.

Further, examples of the metal component which can be preferably used include one or more selected from calcium ion, magnesium ion, aluminum ion, zinc ion, bismuth ion, manganese ion, sodium ion, potassium ion and/or a protonated nitrogen base. More preferred are one or more selected from calcium ion, magnesium ion, aluminum ion and zinc ion.

Specific examples of the phosphinates which can be preferably used include calcium dimethylphosphate, magnesium dimethylphosphate, aluminum dimethylphosphate, zinc dimethylphosphate, calcium ethylmethylphosphate, magnesium ethylmethylphosphate, aluminum ethylmethylphosphate, zinc ethylmethylphosphate, calcium diethylphosphinate, magnesium diethylphosphinate, aluminum diethylphosphinate, zinc diethylphosphinate, calcium methyl-n-propylphosphinate, magnesium methyl-n-propylphosphinate, aluminum methyl-n-propylphosphinate, zinc methyl-n-propylphosphinate, calcium methanedi(methylphosphinic acid), magnesium methanedi(methylphosphinic acid), aluminum methanedi(methylphosphinic acid), zinc methanedi(methylphosphinic acid), calcium benzene-1,4-(dimethylphosphinate), magnesium benzene-1,4-(dimethylphosphinate), aluminum benzene-1,4-(dimethylphosphinate), zinc benzene-1,4-(dimethylphosphinate), calcium methylphenylphosphinate, magnesium methylphenylphosphinate, aluminum methylphenylphosphinate, zinc methylphenylphosphinate, calcium diphenylphosphinate, magnesium diphenylphosphinate, aluminum diphenylphosphinate and zinc diphenylphosphinate.

From the standpoint of exhibiting especially high flame retardance and suppression of MD occurrence, preferred are calcium dimethylphosphate, aluminum dimethylphosphate, zinc dimethylphosphate, calcium ethylmethylphosphate, aluminum ethylmethylphosphate, zinc ethylmethylphosphate, calcium diethylphosphinate, aluminum diethylphosphinate and zinc diethylphosphinate.

In the present invention, based on a total of 100 parts by mass of the aromatic polyamide and the polyphenylene ether, a preferred amount of the phosphinate is 1 to 50 parts by mass, more preferred is 2 to 25 parts by mass, especially preferred is 2 to 15 parts by mass and most preferred is 3 to 10 parts by mass. To exhibit sufficient flame retardance, the amount of phosphinate is preferably not less than 1 part by mass, and to obtain a suitable melt viscosity for extrusion molding, the amount of phosphinate is preferably not more than 50 parts by mass.

In consideration of the mechanical strength and molded article appearance of the molded article obtained by molding the flame retardant resin composition according to the present invention, a preferred lower limit of average particle size of the phosphinate is 0.1 µm, and a more preferred lower limit is 0.5 µm. A preferred upper limit of number average particle size of the phosphinate is 40 µm, a more preferred upper limit is 20 µm and a most preferred upper limit is 10 µm.

By having a number average particle size of the phosphinate of 0.1 µm or more, handleability and jamming in the extruder or the like are improved during the processing, such as melt-kneading, and is thus preferred. Further, by having a number average particle size of 40 µm or less, the mechanical strength of the resin composition is more easily exhibited, and the surface appearance of the molded article improves.

The number average particle size of the phosphinate can be measured and analyzed using a laser diffraction particle size distribution analyzer (for example, Model: SALD-2000, manufactured by Shimadzu Corporation) by dispersing the phosphinate in water. Using a method of charging water and the phosphinate into a stirring tank equipped with an ultrasonic diffuser and/or a stirrer, the dispersed solution in which the water and the phosphinate are dispersed is fed via a pump to a measuring cell for measuring the particle size by laser diffraction. The number average particle size can be calculated from the frequency distribution of the particle size and the number of particles obtained by the measurement.

Further, so long as the advantageous effects of the present invention are not hindered, the phosphinate in the present invention may contain residual unreacted matter or byproducts.

The phosphinate which can be used in the present invention may be added in advance in the form of a flame retardant master batch mixed with the aromatic polyamide. The ratio of phosphinate in the flame retardant master batch is preferably 10 to 60 parts by mass, and more preferably 20 to 50 parts by mass, based on 100 parts by mass of the flame retardant master batch. While the method for producing this flame retardant master batch is not especially limited, specific examples thereof include (1) melt-kneading a mixture of the aromatic polyamide and the phosphinate mixed in advance without melting; and (2) adding the phosphinate to melted aromatic polyamide and then further melt-kneading the resultant mixture. The latter method is preferred, as the dispersibility of the flame retardant is improved.

The resin composition according to the present invention can be formed as a transparent resin composition by appropriately selecting its constituent components.

A specific example includes a resin composition containing 80 to 40 parts by mass of aromatic polyamide having a terminal amino group concentration of 5 µmol/g or more to 45 µmol/g or less, 20 to 60 parts by mass of polyphenylene ether and 0.05 to 5 parts by mass of a compatibilizer for the aromatic polyamide and the polyphenylene ether, wherein the resin composition has a morphology with the polyphenylene ether in the dispersed phase and the aromatic polyamide in the continuous phase.

Here, the transparency index is a total light transmittance (JIS K7361-1) of 10% or more, and a haze (JIS K7136) of 95% or less.

Examples of transparent moldings according to the present invention include injection moldings, sheets and films.

The total light transmittance (JIS K7361-1) of the molding is preferably 15% or more and more preferably 20% or more. While total light transmittance depends on the thickness of the molding, the total light transmittance as used here represents the total light transmittance of a portion of an injection molding or a sheet having a thickness of 2.5 mm.

A preferred range of the haze value (JIS K7136) of the transparent molding according to the present invention is 92% or less, more preferred is 90% or less, even more preferred is 85% or less and especially preferred is 80% or less.

In this case as well, the haze value is the measured effect for an injection molding or a sheet having a thickness of 2.5 mm.

Measurement of the total light transmittance in the present invention is carried out according to JIS K7361-1:1996, and measurement of the haze is carried out according to JIS K7136:2000. In addition, generally, haze is defined as a ratio of diffuse transmittance to total light transmittance.

The transparent molding according to the present invention has no impact modifier added thereto, or a minute amount which is not enough to affect transparency may be added. If more than a certain amount of the impact modifier is necessary to be added, the kind of impact modifier must be chosen for addition. Although specific examples of the impact modifier include the compounds described in the description of the impact modifier of the resin composition, if a large amount is added, transparency may be greatly harmed.

If it is necessary to add a certain amount or more, a preferred impact modifier is a block copolymer, or hydrogenation product thereof, composed of at least one polymer block composed mainly of an aromatic vinyl compound and at least one copolymer block composed mainly of a conjugated diene compound, wherein the block copolymer comprises 55% by mass or more and less than 90% by mass of the polymer block mainly composed of an aromatic vinyl compound. So long as the impact modifier is the block copolymer, or hydrogenation product thereof, as described here, impact resistance can be imparted without greatly harming transparency even if a large amount is added.

Further, all of the components which can be added to the resin composition according to the present invention may be added to the resin composition constituting the transparent molding according to the present invention to the extent that transparency is not harmed.

In addition to the above-described components, additive components may optionally be added to the resin composition, film or transparent molding according to the present invention to the extent that transparency is not harmed.

Examples of additive components include the following:

Flame retardants (for example, halogenated resins, silicone flame retardants, magnesium hydroxide, aluminum hydroxide, ammonium polyphosphate and red phosphorus); fluoropolymers exhibiting a drip prevention effect; fluidity improvers (for example, oils, low molecular weight polyolefins, polyethylene glycol and fatty acid esters); auxiliary flame retardants, such as antimony trioxide; antistatic agents; various peroxides; antioxidants; ultraviolet absorbers; light stabilizers; dyes; pigments; impregnating agents and the like. The respective blended amount of these additive components is in the range of not more than 20 parts by mass based on a total of 100 parts by mass of the polyamide and the polyphenylene ether, and in the range of not more than 50 parts by mass of the total content.

Examples of the processing machine for obtaining the resin composition according to the present invention include single screw extruders, twin screw extruders, rolls, kneaders, a Brabender Plastograph, Banbury mixers and the like. Among them, twin screw extruders are preferred, especially preferred are twin screw extruders with an upstream side feed opening and one or more downstream side feed openings having a screw diameter of 25 mm or more and an L/D of 30 or more, and most preferred are twin screw extruders having a screw diameter of 45 mm or more and an L/D of 30 or more. The upper limit of the screw diameter is preferably 120 mm or less, from the standpoint of controlling the increase in resin temperature.

The cylinder setting temperature of the processing machine at this stage is not especially limited, and the conditions which can obtain a preferred resin may be freely selected from usually 240 to 360° C. However, a preferred setting temperature is in the range of 300 to 350° C.

When producing a molded article using the resin composition according to the present invention, various molding methods and molding machinery which are generally used may be used according to the kind, application, shape and the like of the desired molded article. Although not limited to the following, the molded article may be produced using the thermoplastic resin composition according to the present invention by an arbitrary molding method, such as injection molding, extrusion molding, press molding, blow molding, calender molding and flow cast molding. In addition, molding can be carried out through a combination of these molding techniques. Further, various thermoplastic resins or composite moldings of various materials, for example a composition of such thermoplastic resin, a thermosetting resin, paper, cloth, metal, wood and ceramic, may also be used.

Since the resin composition according to the present invention has many excellent characteristics, by performing a molding process like that described above, the resin composition can be effectively used in the production of automotive parts, industrial materials, industrial supplies, electric or electronic parts, machine parts, parts for office machines, household goods, sheets, films, fibers and various molded articles having other arbitrary shapes and applications.

Specific examples which can be preferably used include: motorbike and automotive electrical parts typified by relief block materials and the like; IC tray materials; chassis and cabinets for various disc players and the like; electric and electronic parts for SMT connectors and the like; office automation parts and mechanical parts for various computers and peripheral devices thereof and the like; as well as exterior parts typified by motorbike cowls, automotive bumpers and fenders, door panels, various moldings and emblems, outer door handles, door mirror housings, wheels, caps, roof rails and stay materials thereof, spoilers and the like; interior parts typified by instrument panels, console boxes, trims and the like; automotive underhood parts; and automotive engine periphery parts. Examples which can be especially preferably used include electric and electronic parts for SMT connectors and the like, and automotive exterior materials.

The resin composition according to the present invention can be used as a film. It is noted that, depending on the person skilled in the art, while a film may also be referred to as a sheet depending on its thickness, there is no threshold regarding the thickness for clearly differentiating between a film and a sheet.

Specifically, the present invention provides a film or a sheet having a thickness of 1 to 200 μm composed of a resin composition comprising 80 to 40 parts by mass of an aromatic polyamide composed of dicarboxylic acid units (a) containing 60 to 100% by mole of terephthalic acid units, and diamine units (b) containing 60 to 100% by mole of 1,9-nonamethylenediamine units (b-1) and/or 2-methyl-1,8-octamethylenediamine units (b-2), 20 to 60 parts by mass of polyphenylene ether and 0.05 to 5 parts by mass of a compatibilizer for the aromatic polyamide and the polyphenylene ether.

Details relating to the aromatic polyamide, polyphenylene ether and compatibilizer for the aromatic polyamide and the polyphenylene ether mentioned here are the same as those described in detail for the resin composition.

Further, all of the components which may be added to the resin composition according to the present invention can be added to the resin composition used for the film.

The film according to the present invention can be obtained using the resin composition according to the present invention as a raw material by extrusion film molding and the like, or by directly charging each of the components constituting the resin composition according to the present invention into an extrusion film molding machine while simultaneously kneading and film-molding the mixture.

The film according to the present invention can be produced by an extrusion tubular method, and in some cases, by the so-called inflation method. For producing a film having an even film thickness without layer peeling, it is very important to regulate the temperature of a parison, which is suitably selected from the temperature range of 50 to 310° C., so that the parison coming out of the cylinder is not immediately cooled. A multilayer film of the polyamide-polyphenylene ether resin composition according to the present invention and another resin can be obtained by the multilayer inflation method.

Further, the film according to the invention can be also produced by T-die extrusion molding. In this case, the film may be used without stretching or may be obtained by uniaxial stretching or biaxial stretching. If it desired to increase the strength of the film, this can be achieved by stretching. Further, a multilayer film of the polyamide-polyphenylene ether resin composition according to the present invention and another resin can be obtained by the multilayer T-die extrusion molding method.

The thus-obtained film according to the present invention has excellent heat resistance, low water absorbance, excellent chemical resistance, tear resistance, high-temperature strength, and vacuum moldability when subjected to vacuum molding in a subsequent step. In addition, this film has low thermal shrinkage, and excellent flame retardancy, mechanical strength, and electrical properties typified by insulation properties, dielectric constant and dielectric dissipation factor, as well as excellent hydrolysis resistance. Therefore, this film can be used for applications requiring these characteristics.

Examples of such applications include for printed circuit board materials, printed circuit board peripheral components, semiconductor packages, data magnetic tapes, APS photographic film, film capacitors, insulating film, insulating materials for motors, transformers and the like, speaker diaphragms, film sensors for automobiles, wire cable insulating tape, TAB tape, power generator slot liner interlayer insulating materials, toner agitators, insulating washers for lithium ion batteries and the like.

EXAMPLES

The present invention will now be described in more detail by the following examples and comparative examples. However, the present invention is in no way limited to these examples and comparative examples.
(Used Raw Materials)
1. Production of the Aromatic Polyamide (Polyamide 9T)

Following the method described in the Examples of JP-A-2000-103847, terephthalic acid as the dicarboxylic acid component, 1,9-nonamethylenediamine and 2-methyl-1,8-octamethylenediamine as the diamine component, and octylamine or benzoic acid as the terminal-blocking agent, sodium hypophosphite monohydrate as the polymerization catalyst and distilled water were charged into an autoclave, which was then closed (the moisture content in the system was 25% by weight). After the autoclave was thoroughly purged with nitrogen, the mixture was stirred for 2 hours and the internal temperature was increased to 260° C. In that condition, the compounds were reacted for 1 hour. The internal pressure at this stage was 46 atmospheres.

Next, while maintaining the temperature inside the reactor at 260° C. and the moisture content at 25% by weight, the reaction product was taken out of the reactor over a period of 3 minutes into a vessel having a nitrogen atmosphere and having ordinary temperature and ordinary pressure through a nozzle (6 mm in diameter) at the bottom of the reactor. Then, the reaction product was dried at 120° C. to obtain a powdery, non-foaming primary polycondensate.

The temperature of this powdery primary polycondensate was increased over 2 hours to 250° C. under a nitrogen atmosphere while stirring, and then the resultant product was subjected as is to solid-phase polymerization for a given period of time.

Aromatic polyamides were obtained having various terminal group concentrations and intrinsic viscosities by appropriately changing the kind and amount of terminal-blocking agent as well as adjusting the solid-phase polymerization time.

Measurement of the terminal blocking ratio and terminal group concentration of the obtained aromatic polyamides was carried out according to the measurement of terminal blocking ratio described in the Examples of JP-A-7-228689. Quantification of the phosphorus element was carried out by high-frequency inductively-coupled plasma (ICP) emission analysis at a wavelength of 213.618 (nm) using an IRIS/IP manufactured by Thermo Jarrell Ash Corp.

2. Polyphenylene Ether: Poly(2,6-Dimethyl-1,4-phenylene ether)
    PPE-1: Reduced viscosity of 0.52 dl/g (measured in a 0.5 g/dl chloroform solution at 30° C.)
    PPE-2: Reduced viscosity of 0.41 dl/g (measured in a 0.5 g/dl chloroform solution at 30° C.)
3. Impact Modifier
    SEBS-1: Polystyrene-hydrogenated polybutadiene-polystyrene block copolymer
    Number average molecular weight=246,000
    Styrene component total content=33%
    SEBS-2: Polystyrene-hydrogenated polybutadiene-polystyrene block copolymer
    Number average molecular weight=110,000
    Styrene component total content=67%
4. Compatibilizer for the Polyamide and Polyphenylene Ether
    MAH: Maleic anhydride; Trade name Crystalman-AB (manufactured by NOF Corporation)
    CA: Citric acid monohydrate (manufactured by Wako Pure Chemical Industries, Ltd.)
    FA: Fumaric acid (Wako Pure Chemical Industries, Ltd.)
5. Crystal Nucleating Agent
    Talc-1: Talc having an average particle size of 2.5 μm (non-surface treated)
    Talc-2: Talc having an average particle size of 5.0 μm (non-surface treated)
6. Reinforcing Inorganic Filler
    GF-1: Chopped strand glass fibers having a fiber diameter of 13 μm bound with a novolac epoxy compound
    ECS03T-747, manufactured by Nippon Electric Glass Co., Ltd.
    GF-2: Chopped strand glass fibers having a fiber diameter of 13 μm bound with an acrylic compound
    ECS03T-297, manufactured by Nippon Electric Glass Co., Ltd.
7. Conductivity Imparting Agent
    KB: Ketjen Black EC600JD
8. Aliphatic Polyamide
    PA66: Polyhexamethylene adipamide
    Intrinsic viscosity [η]: 2.0
    Terminal amino group concentration of 33 μmol/g, terminal carboxyl group concentration of 39 μmol/g,
9. Aluminum Diethylphosphinate
    DEP: Exolit OP930 (manufactured by Clariant Japan), average particle size of 5 μm Examples 1-4

Present Invention

Using a twin screw extruder with one feed opening in the upstream and one feed opening in the middle of the extruder (ZSK-25, manufactured by Coperion, Germany), and with the temperature from the upstream feed opening to the middle feed opening set to 320° C. and the temperature from the middle feed opening to die set to 280° C., 40 parts by mass of PPE-1, 10 parts by mass of SEBS-1 and 0.4 parts by mass of MAH were fed from the upstream feed opening at a screw rotation speed of 300 rpm and an output of extruding of 15 kg/h. The mixture was melt-kneaded, and then 50 parts by mass of PA9T and 0.05 parts by mass of Talc-1 were fed thereto from the middle feed opening. This mixture was melt-kneaded, extruded and cut to produce a resin composition pellet. It is noted that the SEBS and MAH were used as a mixture mixed by a tumbler, and that the PPE was fed into the extruder using a separate feed apparatus from these materials. Further, the PA9T and the Talc-1 were used as a mixture which had been mixed for 3 minutes at 700 rpm by a Henschel mixer.

All of the PA9T used at this stage was a powder having an average particle size of about 500 μm, an N/I ratio of 85/15 and an intrinsic viscosity [η] of about 1.2. The phosphorus element concentration in the polyamide 9T was about 300 ppm (quantified by high-frequency inductively-coupled plasma (ICP) emission analysis at a wavelength of 213.618 (nm) using an IRIS/IP manufactured by Thermo Jarrell Ash Corp), although the terminal group concentrations were each different. The terminal group concentrations are shown in Table 1.

The obtained pellets were placed into an 80° C. hot-air dryer immediately after extrusion to evaporate adherent water, and then placed in an aluminum-coated waterproof bag to prevent water absorption.

Using the obtained pellets, tests concerning the following characteristics were carried out. The results are shown in Table 1.

<MVR>

The MVR of the resin pellets was measured according to ISO1133 at a cylinder temperature of 310° C. and a load of 5 kg.

<Izod Impact Strength>

A 4 mm-thickness multipurpose test piece according to ISO294-1 and a 50×90×2.5 mm flat plate test piece were molded from the resin pellets using the IS-80EPN injection molding machine (manufactured by Toshiba Machine Co., Ltd.) at a cylinder temperature of 330° C. and a mold temperature of 130° C.

Izod impact strength was measured using the obtained multipurpose test piece according to ISO180.

<Tensile Elongation>

Tensile elongation was measured using the obtained multipurpose test piece according to ISO527-1.

<Linear Expansion Coefficient>

A 50 (flow direction)×90 (direction perpendicular to the flow)×2.5 mm (thickness direction) flat plate test piece was, with the thickness direction left as is, cut using a precision cutting saw to a 10 mm (flow direction)×4 mm (direction perpendicular to the flow) shape to obtain a cuboid shaped test piece. Using the obtained test piece, the linear expansion coefficient in the flow direction was measured under a nitrogen atmosphere using a TMA-7 (manufactured by PerkinElmer Inc.). Measurements were carried out under the following conditions to calculate the linear expansion coefficient in the range of −30° C. to 120° C.

Measurement temperature: −50° C. to 150° C.
Rate of temperature increase: 5° C./min
Preload weight: 10 mN <Dart Impact Strength>

Using the obtained 50×90×2.5 mm flat plate test piece, an impact test was carried out from a height of 128 cm using a graphic impact tester (manufactured by Toyo Seiki Seisakusho, Ltd.) having a holder diameter of 40 mm, a striker diameter of 12.7 mm and a striker load of 6.5 kg, and the total absorbed energy was measured under two temperature conditions of 23° C. and −30° C. It is noted that the measuring temperatures were 23° C. and −30° C. In the −30° C. measurement, dart impact strength was measured by quickly removing the test piece which had been temperature-adjusted for at least 30 minutes in a thermostatic bath set at −30° C.

<Weld Strength Retention>

A molded piece for weld strength measurement was molded using the IS-80EPN injection molding machine at a cylinder temperature of 340° C. and a mold temperature of 140° C. The molded piece for weld strength measurement was a test piece 128 mm in length, 12.8 mm in width and 0.8 mm in thickness having a gate for resin inflow at both ends in the length direction. Resin which flows in from both ends collides in the middle of the test piece to form a weld portion. A test piece having the same dimensions was also formed as a blank by closing one of the gates so that the weld portion did not form.

The respective tensile yield strengths (the strength at tensile fracture for those pieces which fracture before yielding) of both of the obtained test pieces were measured. At this stage, the test was carried out by a method basically according to ISO527, except that the distance between the crossheads was 100 mm and the crosshead speed was fixed at 5 mm/min. The ratio of the tensile yield strength of the test piece having a weld portion to the tensile yield strength of the test piece not having a weld portion was used to represent weld strength retention.

Examples 5 and 6

Comparison

Extrusion, molding and evaluation were carried out in the same manner as Example 1. The polyamide 9T terminal amino group concentration was beyond the scope defined in the claims of the present invention. The obtained results are shown in Table 1.

Example 7

Present Invention

Everything was carried out in the same manner as Example 4, except that PA9T having an N/I ratio of 95/5 was used. Excluding the fact that the N/I ratio was different, the PA9T used in Example 7 and the PA9T used here were identical. The obtained results are shown in Table 1.

Example 8

Present Invention

Everything was carried out in the same manner as Example 3, except that the PA9T was a mixture of PA9T having a terminal amino group concentration of 10 μmol/g and 30 μmol/g. The terminal amino group concentration of the PA9T mixture was adjusted in a blending ratio so as to be the same as Example 3. The obtained results are shown in Table 1.

TABLE 1

|  |  | Example 1 Present invention | Example 2 Present invention | Example 3 Present invention | Example 4 Present invention | Example 5 Comparison | Example 6 Comparison | Example 7 Present invention | Example 8 Present invention |
|---|---|---|---|---|---|---|---|---|---|
| PA9T[NH$_2$] | μmol/g | 10 | 20 | 30 | 40 | 4 | 60 | 30 | 20 |
| PA9T[COOH] | μmol/g | 80 | 65 | 45 | 45 | 85 | 20 | 50 | 65 |
| PA9T terminal blocking ratio | % | 53 | 55 | 63 | 56 | 55 | 54 | 61 | 56 |
| MVR | cc/10 min | 10.5 | 9.6 | 8.5 | 6 | 11 | 2.2 | 5.5 | 11.5 |
| Izod impact strength (23° C.) | kJ/m$^2$ | 27 | 33 | 48 | 42 | 12 | 35 | 34 | 45 |

TABLE 1-continued

|  |  | Example 1 Present invention | Example 2 Present invention | Example 3 Present invention | Example 4 Present invention | Example 5 Comparison | Example 6 Comparison | Example 7 Present invention | Example 8 Present invention |
|---|---|---|---|---|---|---|---|---|---|
| Dart impact strength (23° C.) | J | 35 | 44 | 48 | 46 | 19 | 35 | 40 | 46 |
| Dart impact strength (−30° C.) | J | 21 | 30 | 32 | 30 | 10 | 25 | 25 | 33 |
| Tensile elongation | % | 20 | 41 | 50 | 43 | 15 | 22 | 29 | 63 |
| Linear expansion coefficient | ×10$^{-6}$ ° C.$^{-1}$ | 6.6 | 6.9 | 6.7 | 6.8 | 6.7 | 6.6 | 6.9 | 6.1 |
| Weld strength retention | % | 85 | 92 | 95 | 87 | 68 | 96 | 86 | 99 |
| Note |  |  |  |  |  |  |  | *1 | *2 |

Composition: PPE-1/SEBS-1/PA9T/MAH/Talc-1 = 40/10/50/0.4/0.05
*1: The PA9T had an N/I ratio of 95/5
*2: The PA9T was a mixture of [NH$_2$] = 10 PA9T and [NH$_2$] = 30 PA9T (1/1 in terms of mass ratio)

Example 9

Present Invention

Using a twin screw extruder with one feed opening in the upstream, one feed opening in the middle and one feed opening in the downstream of the extruder (ZSK-40MC, manufactured by Coperion, Germany], and with the cylinder setting temperatures all set to 320° C., 18 parts by mass of PPE-2 and 0.3 parts by mass of MAH were fed from the upstream feed opening at a screw rotation speed of 450 rpm and an output of extruding of 150 kg/h. The mixture was melt-kneaded, and then 42 parts by mass of PA9T and 0.1 parts by mass of Talc-1 were fed thereto from the middle feed opening, and 40% by mass of GF-1 and 10% by mass of DEP (% by mass denotation: based on 100% by mass of the total resin composition) were fed from the downstream feed opening. This mixture was melt-kneaded, extruded and cut to produce a resin composition pellet. It is noted that the mixture of PPE and MAH and the mixture of PA9T and Talc-1 had both been mixed for 3 minutes at 700 rpm by a Henschel mixer.

All of the PA9T used at this stage was a powder having an average particle size of about 400 μm, an N/I ratio of 85/15 and an intrinsic viscosity [η] of 0.95. The terminal amino group concentration was 10 μmol/g, and the phosphorus element concentration in the polyamide 9T was about 300 ppm.

The obtained pellet was placed into an 80° C. hot-air dryer immediately after extrusion to evaporate adherent water, and then placed in an aluminum-coated waterproof bag to prevent water absorption.

Using the obtained pellet, tests concerning the following characteristics were carried out. The results are shown in Table 2.

<Deflection Temperature Under Load>

A 4 mm-thickness multipurpose test piece according to ISO294-1 was molded from the resin pellet using the IS-80EPN injection molding machine (manufactured by Toshiba Machine Co., Ltd.) at a cylinder temperature of 330° C. and a mold temperature of 130° C.

The deflection temperature under load at loads of 0.45 MPa and 1.8 MPa was measured using the obtained multipurpose test piece according to ISO75.

<Water Absorption Percentage>

A test piece 128 mm in length, 12.8 mm in width and 0.8 mm in thickness was produced using the same molding machine at a cylinder temperature of 340° C. and a mold temperature of 140° C.

The obtained test piece 128 mm in length, 12.8 mm in width and 0.8 mm in thickness was dipped in 80° C. water for 48 hours, then removed and left to stand for 240 hours in an atmosphere of 23° C. and 50% moisture.

The water absorption percentage of the test piece was calculated according to the following formula from the weight of the molded piece before dipping at this stage and the weight of the molded piece left to stand for 240 hours after dipping.

[(weight of the molded piece left to stand for 240 hours after dipping)/(weight of the molded piece before dipping)−1]×100

<Blister Occurrence During Reflow>

The molded piece used in the water absorption measurement which had been left to stand for 240 hours after dipping in hot water was heated in a hot-air reflow furnace to ascertain the occurrence of blisters (bubbles) and the degree of discoloration in the molded piece. Determination was carried out according to the following standards.

++: No occurrence of blisters. None, or only a slight amount of discoloration in the molded piece.

+: No occurrence of blisters. Distinct discoloration in the molded piece was ascertained.

−: Partial occurrence of blisters

−−: Occurrence of blisters over the entire surface.

Used as the reflow furnace at this stage was the lead-free solder compatible air reflow furnace RA-MS (manufactured by Matsushita Electric Industrial Co., Ltd.). The temperature settings were set so that heater 1 to 8 was 181 to 186° C., heater 9 and 10 was 200° C., heater 11 and 12 was 238° C. and heater 13 and 14 was 275° C. The conveyor belt speed in the reflow furnace was set at 0.45 m/min. Confirmation of the temperature profile in the furnace under these conditions showed that the heat exposure time for 140 to 200° C. was 86 seconds, the heat exposure time for 220° C. or higher was 56 seconds and the heat exposure time for 260° C. or higher was 8 seconds, and that the peak temperature was 263° C.

<Flame Resistance (UL-94VB)>

According to the UL94 method (standards specified by Under Writers Laboratories Inc., U.S.A.), 5 test pieces per sample were measured. The test pieces (127 mm in length, 12.7 mm in width and 1.6 mm in thickness) were molded using the injection molding machine (IS-80EPN, manufactured by Toshiba Machine Co., Ltd.). Molding was carried out at a cylinder temperature of 330° C. and a mold temperature of 150° C.

Flame classifications indicate the class of flame resistance classified according to the UL 94 vertical burning test. However, determination was carried out by subjecting all of the samples to 5 tests.

An outline of the classification method is as follows. Other details followed the UL 94 standards.

V-0: Average burn time no greater than 5 seconds. Maximum burn time no greater than 10 seconds. No dripping of flaming particles.

V-1: Average burn time no greater than 25 seconds. Maximum burn time no greater than 30 seconds. No dripping of flaming particles.

V-2: Average burn time no greater than 25 seconds. Maximum burn time no greater than 30 seconds. Dripping of flaming particles.

Example 10

Comparison

Everything was carried out in the same manner as in Example 9, except that the Talc-1 was not blended. The results are shown in Table 2.

Example 11

Present Invention

Everything was carried out in the same manner as in Example 9, except that PA9T having a terminal amino group concentration of 30 μmol/g was used for the PA9T. The results are shown in Table 2.

Example 12

Comparison

Everything was carried out in the same manner as in Example 11, except that the Talc-1 was not blended. The results are shown in Table 2.

Example 13

Present Invention

Everything was carried out in the same manner as in Example 11, except that the Talc-1 was formed as a master batch melt-kneaded in the PA9T in advance. The results are shown in Table 2.

The master batch was produced by mixing 100 parts by mass of PA9T and 0.24 parts by mass of Talc-1 for 3 minutes at 700 rpm with a Henschel mixer to prepare a mixture, then using a twin screw extruder only having one feed opening in the upstream of the extruder, melt-kneading the mixture with the cylinder temperatures all set to 320° C. at a screw rotation speed of 300 rpm and an output of extruding of 70 kg/h.

Example 14

Present Invention

Everything was carried out in the same manner as in Example 7, except that the talc was changed to Talc-2. The results are shown in Table 2.

Example 15

Present Invention

Everything was carried out in the same manner as in Example 7, except that the blended amount of the Talc-1 was 0.01 parts by mass. The results are shown in Table 2.

Example 16

Present Invention

Everything was carried out in the same manner as Example 9, except that PA9T having an N/I ratio of 70/30 was used. Excluding the fact that the N/I ratio was different, the PA9T used in Example 9 and the PA9T used here were identical. The results are shown in Table 2.

Example 17

Present Invention

Everything was carried out in the same manner as in Example 11, except that the glass fibers were changed to GF-2. The results are shown in Table 2.

TABLE 2

|  |  | Example 9 Present invention | Example 10 Comparison | Example 11 Present invention | Example 12 Comparison | Example 13 Present invention | Example 14 Present invention | Example 15 Present invention | Example 16 Present invention | Example 17 Present invention |
|---|---|---|---|---|---|---|---|---|---|---|
| PA9T[NH$_2$] | μmol/g | 10 | 10 | 30 | 30 | 30 | 30 | 10 | 10(*4) | 30 |
| PA9T[COOH] | μmol/g | 70 | 70 | 45 | 45 | 45 | 45 | 70 | 60 | 45 |
| PA9T terminal blocking ratio | % | 65 | 65 | 63 | 63 | 63 | 63 | 65 | 69 | 63 |
| Talc kind | Part by mass | Talc-1 | None | Talc-1 | None | Talc-1 | Talc-2 | Talc-1 | Talc-1 | Talc-1 |
| Talc blended amount | — | 0.1 | — | 0.1 | — | 0.1 | 0.1 | 0.1 | 0.01 | 0.1 |
| GF kind | ° C. | GF-1 | GF-1 | GF-1 | GF-1 | GF-1 | GF-1 | GF-1 | GF-1 | GF-2 |
| Deflection temperature under load (4.5 MPa) | ° C. | 280< | 280< | 280< | 280< | 280< | 280< | 280< | 263 | 280< |

TABLE 2-continued

|  |  | Example 9 Present invention | Example 10 Comparison | Example 11 Present invention | Example 12 Comparison | Example 13 Present invention | Example 14 Present invention | Example 15 Present invention | Example 16 Present invention | Example 17 Present invention |
|---|---|---|---|---|---|---|---|---|---|---|
| Deflection temperature under load (1.8 MPa) | % | 276 | 272 | 273 | 269 | 280 | 270 | 269 | 243 | 268 |
| Water absorption percentage | ++~-- | 1.1 | 1.3 | 1.2 | 1.4 | 1.1 | 1.15 | 1.15 | 1.1 | 1.3 |
| Blister (260° C.) |  | + | -- | ++ | -- | ++ | + | + | -- | - |
| UL94 |  | V-1 | V-2 | V-0 | V-1 | V-0 | V-0 | V-1 | V-0 | V-0 |
| Note |  |  |  |  |  | *1 |  |  | *2 |  |

Composition: PPE-2/PA9T/MAH/Talc/GF/DEP = 18 Parts/42 Parts/0.3 Part/Indicated in the Table/40%/10%
*1: Talc blended in the PA9T in advance
*2: PA9T had an N/I ratio of 70/30

Examples 18 to 19

Present Invention

Using a twin screw extruder (TEM58SS, manufactured by Toshiba Machine Co., Ltd., Japan) having one feed opening in the upstream and one feed opening in the middle of the extruder, and with the cylinder setting temperatures all set to 320° C., 18 parts by mass of PPE-1, 18 parts by mass of PPE-2, 6 parts by mass of SEBS-1, 4 parts by mass of SEBS-2 and 0.2 parts by mass of a compatibilizer (MAH in Example 18, CA in Example 19, and no-addition in Example 20) were fed from the upstream feed opening at a screw rotation speed of 400 rpm and an output of extruding of 450 kg/h. The mixture was melt-kneaded, and then 52 parts by mass of PA9T, 0.1 parts by mass of Talc-1, 100 ppm of copper iodide, 2,000 ppm of potassium iodide and 2.0 parts by mass of KB were fed thereto from the middle feed opening. This mixture was melt-kneaded, extruded and cut to produce a resin composition pellet. It is noted that 1 part by mass of PPE-1 and the SEBS-1, SEBS-2 and the compatibilizer were used as a mixture which had been mixed by a tumbler, and that the remaining PPE-1 and the PPE-2 were fed into the extruder using respectively separate feed apparatuses. Further, the mixture of PA9T, Talc-1, copper iodide, potassium iodide and KB had been mixed for 3 minutes at 700 rpm by a Henschel mixer.

All of the PA9T used at this stage was a powder having an average particle size of about 500 μm, an N/I ratio of 85/15 and an intrinsic viscosity [η] of 1.2. The terminal amino group concentration was 30 μmol/g, and the phosphorus element concentration in the polyamide 9T was about 300 ppm.

The obtained pellets were placed into an 80° C. hot-air dryer immediately after extrusion to evaporate adherent water, and then placed in an aluminum-coated waterproof bag to prevent water absorption.

Using the obtained pellets, tests concerning the following characteristics were carried out. The results are shown in Table 3.

<Izod Impact Strength>
Was carried out using the same procedures as in Example 1.
<Weld Strength Retention>
Was carried out using the same procedures as in Example 1.
<Dispersed Particle Size>
Using an ultramicrotome, an ultrathin section piece having a thickness of 80 nm in the direction in which the flow direction of the obtained resin pellets could be observed was produced. This piece was observed with a transmission electron microscope, whereby it was confirmed for all of the samples that the aromatic polyamide formed the continuous phase and that the polyphenylene ether formed the dispersed phase. Further, 10 photographs were taken at a 5,000 times observed magnification, and based on the obtained electron microscope photographs, the average particle size of the PPE dispersed particles was determined. Specifically, the short and long axes of 1,000 dispersed particles, which were randomly selected rather than selected intentionally, were measured. The average thereof was determined to specify their respective particle sizes, and the average particle size ($\Sigma di/ni$) of these was calculated.

<Conductivity>
An approximately 0.3 to 0.5 mm cut was made with a cutter knife at positions 25 mm in either end direction from the middle of the multipurpose test piece used in the Izod impact test. The test piece was then dipped for about 30 minutes in a cooling liquid of dry ice/methanol. The test piece was removed, and both ends were broken off to obtain a cuboid fractured sample having a length direction of 50 mm. Silver paste was coated on the fractured faces, which were then thoroughly dried. The resistivity between the two ends was measured at an applied voltage of 250 V using an electrometer (R8340A, manufactured by Advantest Corporation). The obtained resistivity is represented as volume resistivity according to the following formula. The obtained results are shown in Table 3.

(Volume resistivity)=(voltage measured by a voltmeter)×(cross-section of the test piece)/(length of the test piece)

TABLE 3

|  |  | Example 18 Present invention | Example 19 Present invention | Example 20 Comparative example |
|---|---|---|---|---|
| PA9T[NH$_2$] | μmol/g | 30 | 30 | 30 |
| PA9T[COOH] | μmol/g | 45 | 45 | 45 |
| PA9T terminal blocking ratio | % | 63 | 63 | 63 |
| Compatibilizer kind |  | MAH | citric acid | None |
| Compatibilizer amount |  | 0.2 | 0.6 | 0 |
| Izod impact strength | kJ/m$^2$ | 22 | 12 | 2.3 |
| Weld strength retention | % | 85 | 65 | 5 |
| Dispersed particle size | μm | 0.8 | 2.9 | 10 or higher |
| Conductivity | Ω · cm | 5 × 10$^4$ | 2 × 10$^4$ | Not carried out |

PPE-1/PPE-2/SEBS-1/SEBS-2/PA9T/KB = 18/18/6/4/52/2.0
As trace components, including 100 ppm of CuI and 2,000 ppm KI, and including 0.1 part by mass of Talc-1.

Example 21

Present Invention

Using the same twin screw extruder as in Example 1, and with the temperature from the upstream feed opening to the die set to 320° C., 40 parts by mass of PPE-2, 6 parts by mass of SEBS-1, 4 parts by mass of SEBS-2 and 0.4 parts by mass of MAH were fed from the upstream feed opening at a screw rotation speed of 300 rpm and an output of extruding of 15 kg/h. The mixture was melt-kneaded, and then 50 parts by mass of PA9T and 0.08 part by mass of Talc-1 were fed thereto from the downstream feed opening. This mixture was melt-kneaded, extruded and cut to produce a resin composition pellet.

It is noted that at this stage 1 part by mass of the PPE-1 and all of the SEBS-1, SEBS-2 and MAH were used as a mixture which had been mixed by a tumbler, and that the remaining PPE was fed into the extruder using a separate feed apparatus. Further, the PA9T and the Talc-1 were used as a mixture which had been mixed for 3 minutes at 700 rpm by a Henschel mixer.

Except for a portion, the PA9T used at this stage was a powder having an average particle size of about 500 μm, an N/I ratio of 85/15 and an intrinsic viscosity [η] of 1.2. The terminal amino group concentration was 20 μmol/g. The phosphorus element concentration in the polyamide 9T was about 300 ppm, although the terminal group concentrations were each different. The terminal group concentrations are shown in Table 4.

The obtained pellets were placed into an 80° C. hot-air dryer immediately after extrusion to evaporate adherent water, and then placed in an aluminum-coated waterproof bag to prevent water absorption.

Using the obtained pellets, tests concerning the following characteristics were carried out. The results are shown in Table 4.

<MVR>

Measurement was carried out in the same manner as in Example 1.

<Izod Impact Strength>

Measurement was carried out in the same manner as in Example 1.

<Tensile Elongation>

Measurement was carried out in the same manner as in Example 1.

<Dart Impact Strength>

Measurement was carried out in the same manner as in Example 1.

<Deflection Temperature Under a Load of 4.5 MPa>

Measurement was carried out in the same manner as in Example 1.

Example 22

Present Invention

Everything was carried out in the same manner as Example 21, except that among the PA9T used in Example 21, 20% by mass thereof was changed to PA66. The results are shown in Table 4.

Example 23

Present Invention

Everything was carried out in the same manner as Example 21, except that among the PA9T used in Example 21, 50% by mass thereof was changed to PA66. The results are shown in Table 4.

TABLE 4

|  |  | Example 21 Present invention | Example 22 Present invention | Example 23 Present invention |
| --- | --- | --- | --- | --- |
| PA9T[NH$_2$] | μmol/g | 20 | 20 | 20 |
| PA9T[COOH] | μmol/g | 65 | 65 | 65 |
| PA9T terminal blocking ratio | % | 55 | 55 | 55 |
| PA66 content in the PA | % by mass | 0 | 20 | 50 |
| MVR | cc/10 min | 12.3 | 14.2 | 35 |
| Izod impact strength (23° C.) | kJ/m$^2$ | 35 | 46 | 45 |
| Tenside elongation | % | 25 | 45 | 40 |
| Dart impact strength (23° C.) | J | 42 | 49 | 48 |
| Dart impact strength (−30° C.) | J | 31 | 39 | 42 |
| DTUL (0.45 MPa) | ° C. | 209 | 207 | 199 |

PPE-2/SEBS-1/SEBS-2/MAH/PA/Talc-1 = 40/6/4/0.4/50/0.08

Example 24

Present Invention

Using a single screw extruder (manufactured by Union Plastics Co., Ltd., screw diameter 40 mm, L/D 28) and a coathanger die (width 400 mm, die lip gap 0.8 mm), a pellet obtained in Example 3 was extruded in a film form at a cylinder temperature of 320° C. While adjusting the revolution speed of the screw and the pick-up roll, pick-up was carried out so as to draw in a uniaxial direction to adjust the thickness to 100 μm. The tear resistance and uniformity of film thickness of the film obtained at this stage were evaluated.

Further, the setting temperature of the heater was adjusted so that the film would have a surface temperature of 320° C., and the obtained film was vacuum-molded into a cup-shaped molding. The shape of the cup had an open portion diameter of 3 cm, a bottom diameter of 2 cm and a depth of 2 cm. As a result, a vacuum molding was obtained having excellent thickness uniformity.

Separate to this, a pellet obtained in Example 3 was fed into a single screw extruder molding machine having a diameter of 30 mmϕ and extruded in a sheet form having a width of 400 mm. The thickness of the sheet was measured to be about 2.5 mm. The drawdown characteristics and die line occurrence of the sheet during extrusion were evaluated. The results are shown in Table 5.

<Film Tear Resistance>

An approximately 5 mm cut was made with a pair of scissors in one edge of the film, which was then torn by hand in a perpendicular direction to the drawing direction. The ease of tearing was evaluated at this point. Cases where tearing was not easy, and the tear direction veered towards the drawing direction were evaluated as "+", and cases where the tear direction did not change were evaluated as "−"

<Film Thickness Uniformity>

Thickness was measured at 5 locations in the perpendicular direction to the drawing direction of the obtained film. The range of thickness variation was used as the evaluated criteria. Films having smaller thickness variation were evaluated as good films.

<Sheet Extrudability>

The level of drooping (drawdown characteristics) of the molten sheet-form resin during sheet extrusion between the die and the first roller located about 15 cm from the die in a horizontal direction was visually evaluated according to the following criteria.

+++: The sheet reached the roller with the entire sheet keeping an even horizontal state, and no occurrence of die lines.

++: The sheet reached the roller with the entire sheet keeping an even horizontal state, but die lines occurred.

+: Severe drawdown, and the sheet could not be properly molded.

Example 25

Comparison

Everything was carried out in the same manner as Example 25, except that a pellet obtained in Example 5 was used. The results are shown in Table 5.

Further, while vacuum moldability was evaluated, a hole opened in the bottom of the cup, so that a good molding could not be obtained.

Example 26

Comparison

Everything was carried out in the same manner as Example 25, except that a pellet obtained in Example 6 was used. The results are shown in Table 5.

Further, while vacuum moldability was evaluated, a crease formed near the open portion of the molding, so that a good molding could not be obtained.

TABLE 5

| Composition | | Example 24 Present invention Example 3 | Example 25 Comparision Example 5 | Example 26 Comparision Example 6 |
| --- | --- | --- | --- | --- |
| PA9T[NH$_2$] | μmol/g | 30 | 4 | 60 |
| PA9T[COOH] | μmol/g | 45 | 85 | 20 |
| PA9T terminal blocking ratio | % | 63 | 55 | 54 |
| Film tear resistance | | +, − | + | − | + |
| Film thickness uniformity | μm | 95-105 | 92-116 | 85-135 |
| Sheet exturdability | | +++~+ | +++ | + | ++ |

Composition: PPE-1/SEBS-1/PA9T/MAH/Talk-1 = 40/10/50/0.4/0.05

Example 27

Present Invention

With all the cylinder temperatures of the twin screw extruder used in Example 1 set to 320° C., 50 parts by mass of PPE-2 and 0.5 parts by mass of MAH were fed from the upstream feed opening at a screw rotation speed of 300 rpm and an output of extruding of 15 kg/h. The mixture was melt-kneaded, and then 50 parts by mass of PA9T and 0.05 parts by mass of Talc-1 were fed thereto from the downstream feed opening. This mixture was melt-kneaded, extruded and cut to produce a resin composition pellet. It is noted that the mixture of PPE and MAH and the mixture of PA9T and Talc-1 had both been mixed before use for 3 minutes at 700 rpm by a Henschel mixer.

All of the PA9T used at this stage was a powder having an average particle size of about 500 μm, an N/I ratio of 85/15 and an intrinsic viscosity [α] of about 1.2. The phosphorus element concentration in the polyamide 9T was about 300 ppm.

The obtained pellet was placed into an 80° C. hot-air dryer immediately after extrusion to evaporate adherent water, and then placed in an aluminum-coated waterproof bag to prevent water absorption.

The obtained pellet was fed into a single screw extruder molding machine having a diameter of 30 mmφ and extruded in a sheet form having a width of 400 mm. The thickness of the sheet was measured to be about 2.5 mm. The total light transmittance, haze and dart impact strength of this sheet were evaluated. The results showed that the sheet had a total light transmittance of 26%, haze of 91%, and thus the sheet had sufficient translucency. The dart impact strength was about 10 J.

Example 28

Present invention

Everything was carried out in the same manner as Example 28, except that 40 parts by mass of PPE-2, 10 parts by mass of SEBS-2 and 0.4 parts by mass of MAH were fed from the upstream feed opening. Total light transmittance was 27%, haze was 87%, and dart impact strength was about 28 J.

<Total Light Transmittance and Haze>

The obtained sheet having a thickness of about 2.5 mm was cut to a size having 50×90 mm sides. Using the turbidimeter NDH2000 (manufactured by Nippon Denshoku Industries Co., Ltd.), the measurement of total light transmittance was carried out according to JIS K7361-1:1996, and the measurement of haze was carried out according to JIS K7136:2000. Haze was calculated as the ratio (percentage) of diffuse transmittance with respect to total transmittance.

<Dart Impact Strength>

The obtained sheet was cut to a 50×90 size to obtain a flat plate test piece. Using this flat plate test piece, dart impact strength was measured according to the dart impact strength measurement method described in Example 1.

Example 29

Present Invention

The middle feed opening and downstream feed opening of the twin screw extruder used in Example 9 were blocked, and the cylinder setting temperatures were all set to 320° C. 90 parts by mass of PA9T and 10 parts by mass of KB were fed from the upstream feed opening at a screw rotation speed of 300 rpm and an output of extruding of 100 kg/h. This mixture was melt-kneaded, extruded and cut to produce a conductive master batch. This master batch is in the following abbreviated as "MB-1".

The PA9T used at this stage was a powder having an average particle size of about 400 μm, an N/I ratio of 85/15 and an intrinsic viscosity [η] of 0.95. The terminal amino group concentration was 10 μmol/g, and the phosphorus element concentration in the polyamide 9T was about 300 ppm.

The state of the master batch during production was evaluated according to the following index. The obtained results are shown in Table 6.

Next, the middle feed opening of the same twin screw extruder was made ready for use, the temperature settings were made the same, and 18 parts by mass of PPE-1, 18 parts by mass of PPE-2, 6 parts by mass of SEBS-1, 4 parts by mass of SEBS-2 and 0.2 parts by mass of MAH were fed from the upstream feed opening. The mixture was melt-kneaded, and then 32 parts by mass of PA9T, 20 parts by mass of MB-1, 0.1 parts by mass of Talc-1, 100 ppm of copper iodide and 2,000 ppm of potassium iodide were fed thereto from the middle feed opening. This mixture was melt-kneaded, extruded and cut to produce a resin composition pellet. It is noted that 1 part by mass of PPE-1 and the SEBS-1, SEBS-2 and the compatibilizer were used as a mixture which had been mixed by a tumbler, and that the remaining PPE-1 and the PPE-2 were fed into the extruder using respectively separate feed apparatuses. Further, the mixture of PA9T, Talc-1, copper iodide and potassium iodide had been mixed for 3 minutes at 700 rpm by a Henschel mixer. The MB-1 was fed into the extruder using a separate feed apparatus.

The PA9T used at this stage was a powder having an average particle size of about 500 μm, an N/I ratio of 85/15 and an intrinsic viscosity [η] of 1.2. The terminal amino group concentration was 30 mol/g, and the phosphorus element concentration in the polyamide 9T was about 300 ppm.

The obtained pellet was placed into an 80° C. hot-air dryer immediately after extrusion to evaporate adherent water, and then placed in an aluminum-coated waterproof bag to prevent water absorption.

Using the obtained pellet, tests for conductivity and dart impact strength were carried out. The results are shown in Table 6.

<Resin Temperature During Master Batch Production>

The temperature of the strand as it came out from the extruder die was measured by a thermocouple.

<Strand Appearance of the Master Batch>

The appearance of the strands was evaluated according to the following criteria.

+++: Strand having a smooth surface.
++: Strand having some roughness.
+: Strand having a fluffy surface.

<Conductivity>

Measured by the same method as carried out in Examples 18 to 19.

<Dart Impact Strength>

Measured by the same method as carried out in Examples 1 to 4.

Example 30

Present Invention

The middle feed opening of the twin screw extruder used in Example 29 was made ready for use, and 90 parts by mass of PA9T were fed from the upstream feed opening and 10 parts by mass of KB were fed from the middle feed opening. This mixture was melt-kneaded, extruded and cut to produce a conductive master batch. This master batch is in the following abbreviated as "MB-2". Everything else involved in the production of the master batch was carried out in the same manner as in Example 29.

Except for using MB-2, a resin composition pellet was produced in the same manner as in Example 29, and the same evaluations were carried out. The results are shown in Table 6.

Example 31

Present Invention

Using the twin screw extruder used in Example 30, 50 parts by mass of PA9T were fed from the upstream feed opening and 40 parts by mass of PA9T and 10 parts by mass of KB were fed from the middle feed opening using different feeding apparatuses. This mixture was melt-kneaded, extruded and cut to produce a conductive master batch. This master batch is in the following abbreviated as "MB-3". Everything else involved in the production of the master batch was carried out in the same manner as in Example 29.

Except for using MB-2, resin composition pellets were produced in the same manner as in Example 29, and the same evaluations were carried out. The results are shown in Table 6.

Example 32

Present Invention

Everything was carried out in the same manner as in Example 31 to produce a master batch, except for using a premix as the PA9T in which the Talc-1 produced in Example 13 was melt-kneaded in advance in PA9T. This master batch is in the following abbreviated as "MB-4".

The PA9T used at this stage was a powder having an average particle size of about 400 μm, an N/I ratio of 85/15 and an intrinsic viscosity [η] of 0.95. The terminal amino group concentration was 10 μmol/g, and the phosphorus element concentration in the polyamide 9T was about 300 ppm.

Next, using the twin screw extruder used in Example 30, 18 parts by mass of PPE-1, 18 parts by mass of PPE-2, 6 parts by mass of SEBS-1, 4 parts by mass of SEBS-2 and 0.2 parts by mass of MAH were fed from the upstream feed opening. The mixture was melt-kneaded, and then 32 parts by mass of PA9T, 20 parts by mass of MB-1, 100 ppm of copper iodide and 2,000 ppm of potassium iodide were fed thereto from the middle feed opening. This mixture was extruded and cut to produce a resin composition pellet. It is noted that 1 part by mass of PPE-1 and the SEBS-1, SEBS-2 and the compatibilizer were used as a mixture which had been mixed by a tumbler, and that the remaining PPE-1 and the PPE-2 were fed into the extruder using respectively separate feed apparatuses. Further, the mixture of PA9T, copper iodide and potassium iodide had been mixed for 3 minutes at 700 rpm by a Henschel mixer. The MB-4 was fed into the extruder using a separate feed apparatus.

The PA9T used at this stage was a powder having an average particle size of about 500 μm, an N/I ratio of 85/15 and an intrinsic viscosity [η] of 1.2. The terminal amino group concentration was 30 μmol/g, and the phosphorus element concentration in the polyamide 9T was about 300 ppm.

Next, evaluation was carried out in the same manner as in Example 29. The results are shown in Table 6.

TABLE 6

|  |  | Example 29 Present invention | Example 30 Present invention | Example 31 Present invention | Example 32 Present invention |
| --- | --- | --- | --- | --- | --- |
| MB kind | — | MB-1 | MB-2 | MB-3 | MB-3 |
| PA9T shape | — | Powder | Powder | Powder | Pellets |
| Resin temperature during MB processing | °C. | 359 | 352 | 336 | 344 |
| Strand smoothness |  | +++~+ | + | ++ | +++ | +++ |
| Composition conductivity | Ω·cm | $2 \times 10^4$ | $2 \times 10^4$ | $3 \times 10^4$ | $9 \times 10^4$ |
| Dart impact strength | J | 23 | 28 | 39 | 31 |

INDUSTRIAL APPLICABILITY

According to the present invention, a resin composition can be provided having excellent heat resistance, impact strength, low water absorbance, excellent fluidity and a low linear expansion coefficient, and high weld strength, whereby cracking at pin push-in is substantially improved. The resin composition according to the present invention can be employed in a broad range of fields, such as electric or electronic parts, office automation parts, automotive parts and machine parts. In particular, the resin composition is highly effective for automotive exterior panels (automotive fenders and the like) and SMT-applicable parts and the like.

The invention claimed is:

1. A resin composition comprising:
   an aromatic polyamide composed of:
      dicarboxylic acid units (a) containing 60 to 100% by mole of terephthalic acid units, and
      diamine units (b) containing 60 to 100% by mole of 1,9-nonamethylenediamine units (b-1) and/or 2-methyl-1,8-octamethylenediamine units (b-2);
   polyphenylene ether;
   a compatibilizer for the polyamide and the polyphenylene ether; and
   a crystal nucleating agent,
   wherein the aromatic polyamide has a terminal amino group concentration of 5 µmol/g or more and 40 µmol/g or less.

2. The resin composition according to claim 1, wherein the amount of crystal nucleating agent is 0.01 to 1 part by mass based on a total of 100 parts by mass of the aromatic polyamide and the polyphenylene ether.

3. The resin composition according to claim 1, wherein the aromatic polyamide has a terminal amino group concentration of 10 µmol/g or more and 35 µmol/g or less.

4. The resin composition according to claim 1, wherein in the diamine units of the aromatic polyamide, the ratio of the 1,9-nonamethylenediamine units (b-1) based on the total content of 1,9-nonamethylenediamine units (b-1) and 2-methyl-1,8-octamethylenediamine units (b-2) is 75 to 90% by mass.

5. The resin composition according to claim 1, wherein the aromatic polyamide is a powder having an average particle size of 200 to 1,000 µm.

6. The resin composition according to claim 1, wherein the compatibilizer for the aromatic polyamide and the polyphenylene ether is 0.05 to 5 parts by mass based on a total of 100 parts by mass of the aromatic polyamide and the polyphenylene ether.

7. The resin composition according to claim 1, wherein the compatibilizer for the aromatic polyamide and the polyphenylene ether is maleic acid or an anhydride thereof.

8. The resin composition according to claim 1, wherein based on the total content of the aromatic polyamide and the polyphenylene ether, the ratio of the aromatic polyamide is 40 to 80% by mass and the ratio of the polyphenylene ether is 20 to 60% by mass.

9. The resin composition according to claim 1, further comprising 0.1 to 10% by mass of a conductivity imparting agent based on the total content of the resin composition.

10. The resin composition according to claim 9, comprising 0.5 to 5 parts by mass of conductive carbon black as the conductivity imparting agent based on a total of 100 parts by mass of the aromatic polyamide and the polyphenylene ether.

11. The resin composition according to claim 1, further comprising a reinforcing inorganic filler.

12. The resin composition according to claim 11, wherein the reinforcing inorganic filler is a glass fiber bound by an epoxy compound.

13. The resin composition according to claim 11, wherein the amount of the reinforcing inorganic filler is 10 to 60% by mass based on the total content of the resin composition.

14. The resin composition according to claim 1, comprising 100 parts by mass or less of an aliphatic polyamide based on 100 parts by mass of the aromatic polyamide.

15. The resin composition according to claim 14, wherein the aliphatic polyamide is one or more selected from the group consisting of aliphatic polyamides composed of an aliphatic diamine having 4 to 8 carbon atoms and an aliphatic dicarboxylic acid having 4 to 8 carbon atoms, aliphatic polyamides composed of a lactam having 6 to 8 carbon atoms, and aliphatic polyamides composed of an aminocarboxylic acid.

16. The resin composition according to claim 15, wherein the aliphatic polyamide has a larger terminal amino group concentration than the terminal amino group concentration of the aromatic polyamide.

17. The resin composition according to claim 1, further comprising 10 to 70 parts by mass of an impact modifier based on 100 parts by mass of the polyphenylene ether, the impact modifier being a block copolymer composed of a polymer block composed mainly of an aromatic vinyl compound and a polymer block composed mainly of a conjugated diene compound, wherein one of the blocks of the polymer block composed mainly of an aromatic vinyl compound in the block copolymer has a molecular weight in a range of 15,000 to 50,000.

18. An SMT-applicable part comprising the resin composition according to claim 1.

19. A film having a thickness of 1 to 200 µm, comprising a resin composition comprising:
   80 to 40 parts by mass of an aromatic polyamide composed of:
      dicarboxylic acid units (a) containing 60 to 100% by mole of terephthalic acid units, and
      diamine units (b) containing 60 to 100% by mole of 1,9-nonamethylenediamine units (b-1) and/or 2-methyl-1,8-octamethylenediamine units (b-2);
   20 to 60 parts by mass of polyphenylene ether; and
   0.05 to 5 parts by mass of a compatibilizer for the polyamide and the polyphenylene ether,
   wherein the aromatic polyamide has a terminal amino group concentration of 5 µmol/g or more and 40 µmol/g or less.

20. A semitransparent molding comprising a resin composition comprising:
   80 to 40 parts by mass of an aromatic polyamide composed of:
      dicarboxylic acid units (a) containing 60 to 100% by mole of terephthalic acid units, and
      diamine units (b) containing 60 to 100% by mole of 1,9-nonamethylenediamine units (b-1) and/or 2-methyl-1,8-octamethylenediamine units (b-2);
   20 to 60 parts by mass of polyphenylene ether; and
   0.05 to 5 parts by mass of a compatibilizer for the polyamide and the polyphenylene ether, wherein
   the aromatic polyamide has a terminal amino group concentration of 5 µmol/g or more and 40 µmol/g or less,
   the resin composition has a morphology with the polyphenylene ether in a dispersed phase and the aromatic polyamide in a continuous phase, and
   the molding has a total light transmittance (JIS K7361-1) of 10% or more and a haze (JIS K7136) of 95% or less.

* * * * *